(12) United States Patent
McGinn et al.

(10) Patent No.: US 9,592,490 B2
(45) Date of Patent: Mar. 14, 2017

(54) GLASS CATALYSTS FOR SOOT COMBUSTION AND METHODS OF MANUFACTURING THE SAME

(71) Applicant: University of Notre Dame du Lac, Notre Dame, IN (US)

(72) Inventors: Paul J. McGinn, Granger, IN (US); Changsheng Su, Notre Dame, IN (US)

(73) Assignee: University of Notre Dame du Lac, South Bend, IN (US)

( * ) Notice: Subject to any disclaimer, the term of this patent is extended or adjusted under 35 U.S.C. 154(b) by 137 days.

(21) Appl. No.: 13/691,173

(22) Filed: Nov. 30, 2012

(65) Prior Publication Data

US 2013/0345048 A1 Dec. 26, 2013

Related U.S. Application Data

(60) Provisional application No. 61/564,939, filed on Nov. 30, 2011.

(51) Int. Cl.
| | |
|---|---|
| *B01J 23/04* | (2006.01) |
| *B01J 23/02* | (2006.01) |
| *B01J 37/02* | (2006.01) |
| *B01J 37/03* | (2006.01) |
| *B01J 23/00* | (2006.01) |
| *B01D 53/88* | (2006.01) |
| *B01D 53/94* | (2006.01) |
| *B01J 35/04* | (2006.01) |

(52) U.S. Cl.
CPC .............. *B01J 23/04* (2013.01); *B01D 53/88* (2013.01); *B01D 53/944* (2013.01); *B01J 23/002* (2013.01); *B01J 23/02* (2013.01); *B01J 35/04* (2013.01); *B01J 37/0215* (2013.01); *B01J 37/0217* (2013.01); *B01J 37/0219* (2013.01); *B01J 37/0225* (2013.01); *B01J 37/038* (2013.01); *B01D 2255/2022* (2013.01); *B01D 2255/2042* (2013.01); *B01D 2255/30* (2013.01); *B01J 2523/00* (2013.01)

(58) Field of Classification Search
CPC . B01J 23/04; B01J 23/02; B01J 23/002; B01J 2523/00; B01J 35/04; B01J 37/0219; B01J 37/0215; B01J 37/0217; B01J 37/0225; B01J 37/038; B01D 2255/2043; B01D 2255/2022; B01D 2255/30; B01D 53/944; B01D 53/88
USPC .................. 502/100, 232, 300, 340, 344
See application file for complete search history.

(56) References Cited

U.S. PATENT DOCUMENTS

| | | | |
|---|---|---|---|
| 3,810,744 A | | 5/1974 | Dumbaugh, Jr. et al. |
| 4,001,039 A | | 1/1977 | Elmore et al. |
| 4,003,976 A | | 1/1977 | Komatsu et al. |
| 4,761,323 A | * | 8/1988 | Muhlratzer et al. .......... 428/198 |
| 5,250,272 A | | 10/1993 | Knorre et al. |
| 5,338,175 A | * | 8/1994 | Fischer ........................ 425/185 |
| 5,338,715 A | | 8/1994 | Iida et al. |
| 6,423,415 B1 | | 7/2002 | Greene et al. |
| 6,447,731 B1 | | 9/2002 | Sun et al. |
| 6,631,612 B1 | | 10/2003 | Setoguchi et al. |
| 7,166,323 B2 | * | 1/2007 | Chung et al. .................. 427/180 |
| 2004/0065078 A1 | | 4/2004 | Schafer-Sindlinger et al. |
| 2004/0259731 A1 | | 12/2004 | Yan |
| 2006/0018806 A1 | | 1/2006 | Ziebarth et al. |
| 2009/0031712 A1 | * | 2/2009 | McGinn ............... B01D 53/944 60/299 |
| 2009/0163356 A1 | * | 6/2009 | Nilsson ............... B01D 53/944 502/178 |
| 2010/0056362 A1 | * | 3/2010 | Henze .................... B01J 21/066 502/159 |

FOREIGN PATENT DOCUMENTS

| | | |
|---|---|---|
| GB | 2426246 | 11/2006 |
| WO | 0218128 | 3/2002 |
| WO | 2006044268 | 4/2006 |

OTHER PUBLICATIONS

International Search Report and Written Opinion re International Application No. PCT/US2008/052480, issued Aug. 21, 2008, 10 pgs.
Chiao Lin et al., Soot Oxidation in Fibrous Filters. 1. Deposit Structure and Reaction Mechanisms, American Chemical Society, Feb. 12, 1988, 8 pgs.
SEM-COM Production Glasses, Apr. 14, 2010, 4 pgs.
F.E. Lopez-Suarez, et al., "Potassium Stability in Soot Combustion Perovskite Catalysts", Topics in Catalysis, vol. 52, Nos. 13-20, 2097-2100, Published online: Jul. 21, 2009, DOI 10.1007/s11244-009-9385-z, 4 pgs.
Douglas W. McKee, Mechanisms of the alkali metal catalysed gasification of carbon', FUEL, Feb. 1983, vol. 62, 6 pgs.
B.A.A.L. van Setten et al., "Stability of catalytic foam diesel-soot filters based on Cs2O, MoO3, and Cs2SO4 molten-salt catalysts", Applied Catalysis B: Environmental 42 (2003) 11 pgs.
International Preliminary Report Report on Patentability re International Application No. PCT/US2008/052480, issued Aug. 4, 2009, 7 pgs.
Klein, Lisa, C., Sol-Gel Technology for Thin Films, Fibers, Preforms, Electronics, and Specialty Shapes, Center for Ceramics Research, College of Engineering, Rutgers—The State University of New Jersey, Piscataway, New Jersey, Noyes Publications, Park Ridge, New Jersey, 1988, 4 pgs.
http://www.broadchemical.com/Products/SilicaSol.htm, Solloidal Silica/SilcaSol webpage, Nov. 20, 2014, 2 pgs.
Su, Changsheng and McGinn, Paul J., Applied Catalysis B: Environmental, Elsevier, www.elsevier.com/locate/apcatb, Department of Chemical & Biomolecular Engineering, University of Notre Dame, Notre Dame, IN., 138-139 (2013) 70-78, 9 pgs.

* cited by examiner

*Primary Examiner* — Anthony J Zimmer
(74) *Attorney, Agent, or Firm* — Greenberg Traurig, LLP

(57) ABSTRACT

A simplified method of manufacturing a catalyst for soot combustion includes the synthesis of a catalyst composition. A substrate is prepared for receipt of the composition and a sol solution is created utilizing the composition synthesized. Finally, a catalytic coating is applied to the substrate, through use of the sol solution. The catalyst composition may be any suitable composition including a $K_2O$, $CaO$, $SiO_2$ (KCS-1) silcate catalyst, and the substrate may be a wire mesh, such as for example, a commercial metallic wire mesh. The application of the coating to the substrate, may be performed through any suitable coating process including, for example, a sol-gel dipping process, spraying, painting, etc.

4 Claims, 17 Drawing Sheets

GLASS CATALYSTS FOR SOOT COMBUSTION AND METHODS OF MANUFACTURING THE SAME

CROSS REFERENCE TO RELATED APPLICATION

This application is a non-provisional application claiming priority from U.S. Provisional Application Ser. No. 61/564,939, filed Nov. 30, 2011, entitled "Glass Catalysts for Soot Combustion and Methods of Manufacturing the Same" and incorporated herein by reference in its entirety. In addition, this application is related to U.S. patent application Ser. No. 12/021,108 entitled "Catalysts With Slow, Passive Release of Alkali Ions," filed Jan. 28, 2008, and incorporated herein by reference in its entirety.

FIELD OF THE DISCLOSURE

The present description relates generally to a glass catalyst for promoting oxidation of soot and more particularly to glass catalysts for soot combustion and methods of manufacturing the same.

BACKGROUND OF RELATED ART

The high activity of potassium-containing catalysts for soot oxidation has attracted much attention over the past decade. Unfortunately, potassium containing catalysts usually tend to degrade after repeated thermal cycles due to the loss of potassium. This is oftentimes the case for potassium carbonate ($K_2CO_3$) or potassium nitrate ($KNO_3$). This degradation is thought to occur due to loss of potassium through sublimation. Thus the challenge in using potassium and other alkali metal based catalysts is minimizing, if not eliminating, the loss of the potassium or alkali metal.

In many cases, attempts to stabilize potassium have included impregnation of potassium species into a support material. For example, in one attempt to prevent degradation, potassium is incorporated into a more stable crystal structure, such as for example, a perovskite structure. This approach has been common over the past decade, with examples such as potassium catalyzed soot oxidation supported by $TiO_2$, $ZrO_2$, $Al_2O_3$, $SiO_2$, etc. Among these support materials, $Al_2O_3$ and $SiO_2$ do not show any catalytic effect while $TiO_2$, and $ZrO_2$ show very low activity in soot oxidation. The potassium-$TiO_2$ interaction and the improvement of contact conditions between soot and the catalyst, studied by means of thermal programmed reduction (TPR) and X-ray diffraction (XRD), were offered as an explanation for the activity differences for soot oxidation compared to catalysts supported on alumina. $K/ZrO_2$ with a K/Zr ratio=0.14, synthesized from potassium nitrates was reported as providing the highest activity. The reversible transformation of a bridged $NO^{3-}$ and a monodentate $NO^{3-}$ was suggested as a possible mechanism.

In one example, Ogura et al. (2008) tried to prevent potassium losses by using silica-alumina and zeolites as support materials and impregnating potassium as the active catalytic center. The researchers found that the second test cycle of soot oxidation on K/sodalite showed higher activity than the first run. It appears that the state of potassium was changed under thermal conditions with a minor loss of the crystal structure of sodalite resulting from interaction of Al sites and K in aluminosilicate. However, no extended stability test was performed to reveal the relatively long-term catalytic performance in this study. Relatively extended stability testing was performed by Lopez-Suárez et al. when they studied the effect of copper on potassium stability in $K/SrTiO_3$ catalyzed soot oxidation. According to their 6-cycle repeated TPR results, significant degradation was found between the first and second TPR cycle for all potassium catalysts. Even though the less active $Cu/SrTiO_3$ catalysts do not degrade, the addition of copper into $K/SrTiO_3$ structure does not affect the potassium stability.

Research results show that catalysts with potassium can offer temporary high activity for soot combustion. Nevertheless, such catalysts can be readily degraded due to the loss of active potassium. Conversely, an investigation showed that catalysts with immobile potassium ions that are rigidly bound in the lattice give lower activity and higher soot oxidation temperatures. Neither case is ideally suited for the application on a diesel particulate filter (DPF).

As an alternative one can consider the use of potassium containing glasses as catalysts, as described in U.S. patent application Ser. No. 12/021,108, and incorporated herein by reference in its entirety. This approach relies on the slow passive release of potassium from a glass to provide for renewal of the catalytic surface activity of the glass. The purpose is to mitigate the effect of loss of the active potassium species by providing new ions over time.

In additional, several approaches to modeling glass durability have also been described, primarily for predicting the durability of glasses for nuclear waste storage. In this application, the goal is to minimize leaching from, or corrosion of, the glass, with researchers hoping to predict glass behavior over thousands of years. The approaches usually involve considering a glass as a mixture of species with known free energies of hydration. Glass durability is then predicted based upon thermodynamic hydration equations, with the contribution of the various species scaling with mole percentage of components present in the glass.

To design durable glasses, glass reactant species are selected based on hydration reactions that are expected to occur between the glass and an aqueous solution (acidic or basic). This is based on expectations as to whether cations in the glass will anionically complex with silica or other oxides. This is determined from their relative anionic force, which reflects their relative field strength. Cation species that might be incorporated into a glass can be classified as to whether they are network formers (i.e. ions with high atomic field strengths (F), calculated as the atomic charge (Z) divided by the square of the ionic radius (r)), network modifiers (i.e. ions with low atomic field strengths), or intermediate cations, that can act as either network formers or network modifiers. Network modifier cations are oxide species which are highly anionically associated with $[SiO_4]^{-4}$ tetrahedra. Potassium and sodium are examples of network modifiers that have low field strengths, so are susceptible to leaching.

The field strengths are considered along with the relative partial molar free energies of the hydration reactions ($\Delta G_i$) of the cation species that can occur in an aqueous environment. A chemically and electrically balanced hydration reaction can be written for potential components, and the partial molar hydration free energy for each reaction be calculated ($\Delta G_i = \Delta G_{(products)} - \Delta G_{(reactants)}$) for the expected hydration reactions in the environment (e.g. aqueous oxidized basic environment). In another example, Jantzen showed that the thermodynamic free energies of hydration ($\Delta G_{hyd}$) of the silicate and oxide glass components are correlated with their ionic field strengths (F). (Jantzen, C. M. (1992). Thermodynamic Approach to Glass Corrosion. Corrosion of Glass, Ceramics, and Ceramic Superconductors:

principles, testing, characterization and applications. D. E. Clark and B. K. Zoitos. Park Ridge, N.J., Noyes Publications: 153-217). The results of these studies provide a starting point for selecting ions for incorporation into a glass with poor weathering characteristics, as is desired for DPF application. Such a glass should incorporate relatively high levels of low field strength, highly negative free energy of hydration ion species (i.e. alkali ions).

If a glass has insufficient durability it will not be well suited for a DPF environment. For example, FIGS. 1A and 1B, respectively, show a simple $K_2Si_2O_5$ glass before 100 and after 102 multi-cycle soot oxidation. The porous white colored phase in the after photo 102 is a $SiO_2$ rich compound based on XRD and Fourier transform infrared spectroscopy (FTIR) study. This implies there is a decomposition reaction between the $K_2Si_2O_5$ and $C/CO_2$ during soot oxidation.

BRIEF DESCRIPTION OF THE DRAWINGS

For a better understanding of the present disclosure, reference may be had to various examples shown in the attached drawings.

FIG. 10a illustrates the morphology of a coating surface in accordance with the present disclosure.

FIG. 10b illustrates the Energy-dispersive X-ray spectroscopy (EDX) spectrum obtained from the surface shown in FIG. 10a.

DETAILED DESCRIPTION

The following description of example methods and articles is not intended to limit the scope of the description to the precise form or forms detailed herein. Instead the following description is intended to be illustrative so that others may follow its teachings.

In order to overcome at least some of the limitations of the known prior potassium-containing catalysts, and to make a silicate glass catalyst well suited for use across a wide variety of substrates with complex shapes, the present disclosure describes an application in the form of a dip coating. More particularly, in one example, the use of a sol-gel route for processing of the glass is disclosed. A sol-gel process is more environmentally friendly and potentially less expensive than other process routes, and inorganic sol-gel derived coatings exhibit good adhesion strength to metallic substrates. The presently described Sol-gel process may enable one of ordinary skill in the art to control precisely the microstructure of the deposited film, i.e., the pore volume, pore size, and surface area etc. Hence, the present disclosure relates to an example sol-gel technology for coating potassium-containing silicate catalysts on wire-mesh substrates. In such a scenario, a part is dipped in the sol-gel precursor, and then the silicate glass catalyst is formed after a reduced temperature (e.g. 650° C.) anneal.

The present disclosure generally relates to a silica-based glass with a composition chosen so that it can act as a catalyst to promote the oxidation of soot or related carbon based compounds. In particular it relates to the processing, application, and use of an amorphous silica based catalyst that can be used for various purposes including, for example, the regeneration of diesel particulate filters and self-cleaning ovens. The example glass promotes oxidation of soot in diesel exhaust environments at temperatures below 400° C.

In the presently described approach, for the application of glasses as soot combustion catalysts a balance between two characteristics of the glass: melting point and ion delivery, is achieved. The described glass offers easy ion exchange for effective carbon oxidation at low temperatures, but the glass also has a melting point high enough to withstand the diesel exhaust environment without substantial melting or softening.

In addition, the presently disclosed technology is compatible with current "washcoat" practice, whereby a honeycomb ceramic filter or metal filter can be dipped into a liquid washcoat as a means to introduce a catalyst. In the present disclosure, the technology is able to be practiced in the form of a sol-gel coating that can be applied in liquid form, hence providing ease of application for typical porous ceramic or wire substrates. In still further examples, the use of a barrier layer, where needed for reactive substrate, is also disclosed.

Figure 1A:
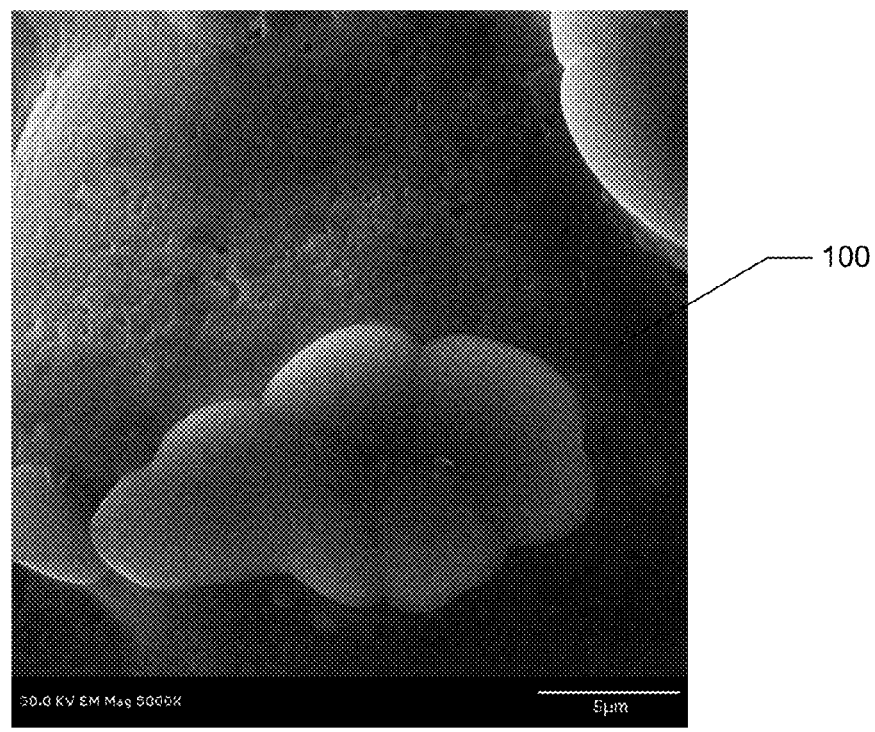
FIGS. 1A-1B illustrates scanning electron microscope (SEM) images in accordance with the prior art.
Figure 1B:
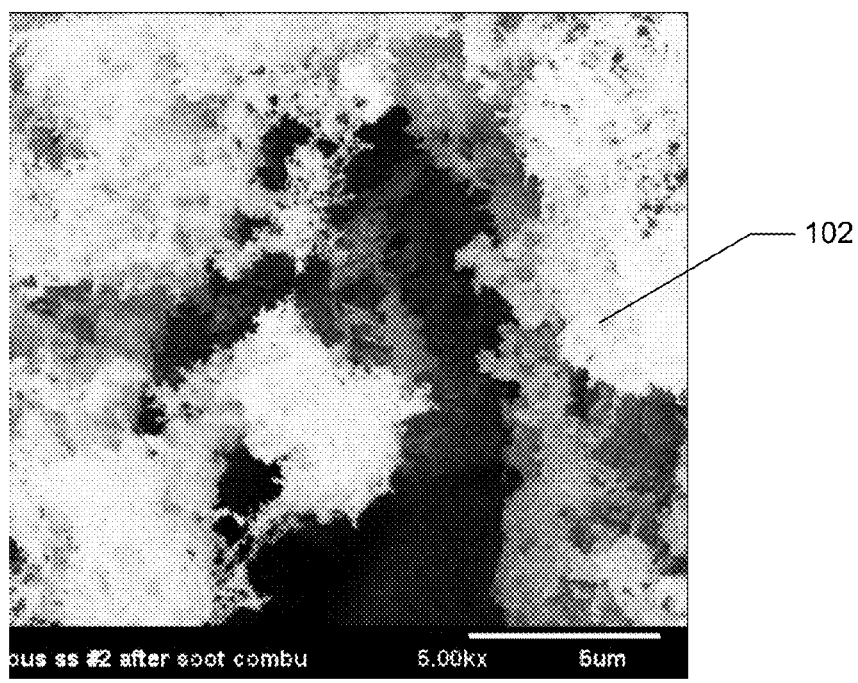
Figure 2:
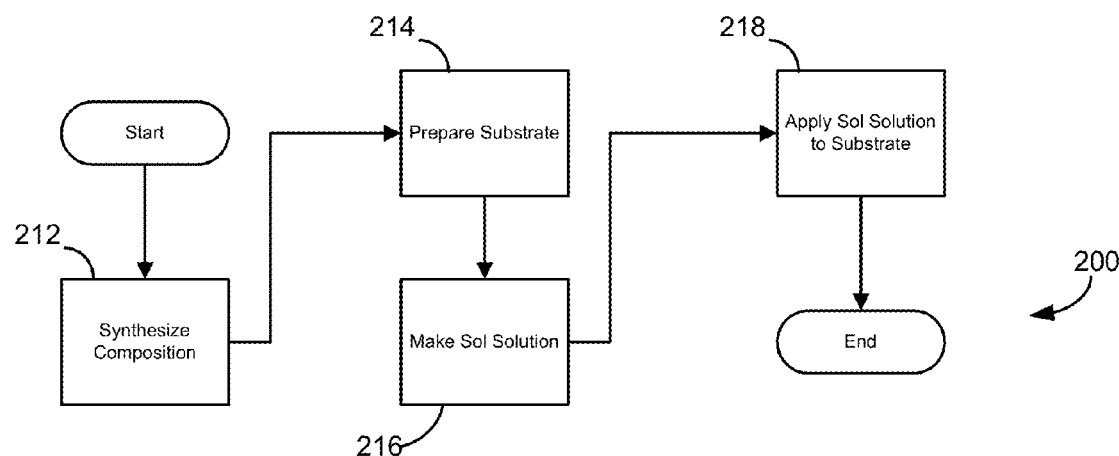
FIG. 2 illustrates in flow chart form a disclosed manufacturing process in accordance with the present disclosure.

Referring now to FIG. 2, a simplified example of manufacturing process 200 is described. In the example process 200, a composition is synthesized at a block 212. As will be described in detail, the composition may be any suitable composition including a $K_2O$, $CaO$, $SiO_2$ (KCS-1) silcate catalyst. Additionally, a substrate is prepared for receipt of the composition at a block 214. In at least one example, the substrate is a wire mesh, such as for example, a commercial metallic wire mesh. At block 216, a sol solution is created utilizing the composition synthesized at block 212. Finally, a catalytic coating is applied to the substrate, through use of the sol solution at a block 218. This too may be performed through any suitable coating process including, for example, a sol-gel dipping process, spraying, painting, etc.

More particularly, in one example, a sol-gel processing, through hydrolysis and condensation of metal alkoxides in organic solvents, may be used to prepare an equivalent KCS-1 composition catalyst. The sol-gel derived catalyst coating enables soot combustion at a lower temperature than a melt-quench derived catalyst equivalent due to the meso-porous structure and the higher surface area. Catalytic coatings on wire mesh may be prepared by dip-coating, and a one-cycle 2 micron thick crack-free coating may be achieved after optimizing the chemical additives, viscosity, and firing process etc. Generally the sol-gel coatings have denser structures than the corresponding sol-gel derived powders because of the simultaneous process of evaporation, gelation, and drying. It will also be appreciated that a protective barrier coating can significantly enhance the stability of K-based coatings by minimizing the substrate/catalyst interactions that might occur during the firing process.

In one specific example, at block 212, tetraethyl orthosilicate ($Si(OC_2H_5)_4$, 98%), calcium nitrate tetrahydrate ($CA(NO_3)_2 \cdot 4H_2O$, ACS reagent) and potassium nitrate ($KNO_3$, ACS reagent) were used as starting materials. From there, a composition equivalent to $K_2O$, $CaO$, $SiO_2$ (KCS-1) silcate catalyst was synthesized.

In the example process 200, a commercial metallic wire mesh, such as wire mesh SS316 (supplied by Tenneco, Lake Forest, Ill.) may be used at block 214 to serve as a substrate to apply a catalytic coating via a sol-gel dipping process at block 218. The example wire mesh may be prepared by cleaning the substrate with, for example, an acid and potassium hydroxide (KOH). In this example, the washed substrate may be further prepared through an ultrasonic bath using ethanol and/or acetone to remove any grease and/or absorbed hydrocarbons on the surface of the substrate.

In the example manufacturing process 200, after making sol solutions (block 216), the solutions are covered, such as by a Pyrex glass beakers for gelation. In this instance, the gelation is allowed to occur at room temperature. The gel point ($t_{gel}$) for malic acid, acetic acid, and nitric acid catalyzed sol-gel systems at room temperature were 160 hrs, 200 hrs, and 480 hrs respectively. In at least one example, a surfactant, such as for example, Triton X-100, may be added to increase gelling time. The use of the surfactant is thought to increase the gelling time due to the increase of charge on sol particles by the surfactant. Additionally, it will be appreciated that an increase of gelling temperature will decrease the gel time.

The substrate may then be coated with the sol-gel solution including, by way of example, through a dipping process. As will be detailed, the coating may be applied at different thicknesses and/or different temperatures to impact the performance of the coated substrate as a soot oxidizer.

To determine the effectiveness of the coated substrate, in one example, soot oxidation was characterized by thermogravimetric analysis (TGA) (TA Instruments 2950). In this instance, approximately 0.5 mg of soot was combusted in each run with 5.0 mg of catalyst (10:1 catalyst/soot ratio). This relatively low soot mass is sufficiently low to avoid concerns about heat transfer and mass transfer limitations. A pre-mixed gas with a composition to simulate diesel exhaust 10% $O_2$-5% $CO_2$—$N_2$ was used. The catalytic activity on soot oxidation was evaluated based on the ignition temperatures ($T_{ig}$) or when half of the soot has been combusted ($T_{50}$). To examine the stability of the catalysts on soot oxidation, the same compounds were subject to repeated soot application and combustion studies in the TGA up to 50 cycles.

Figure 3:
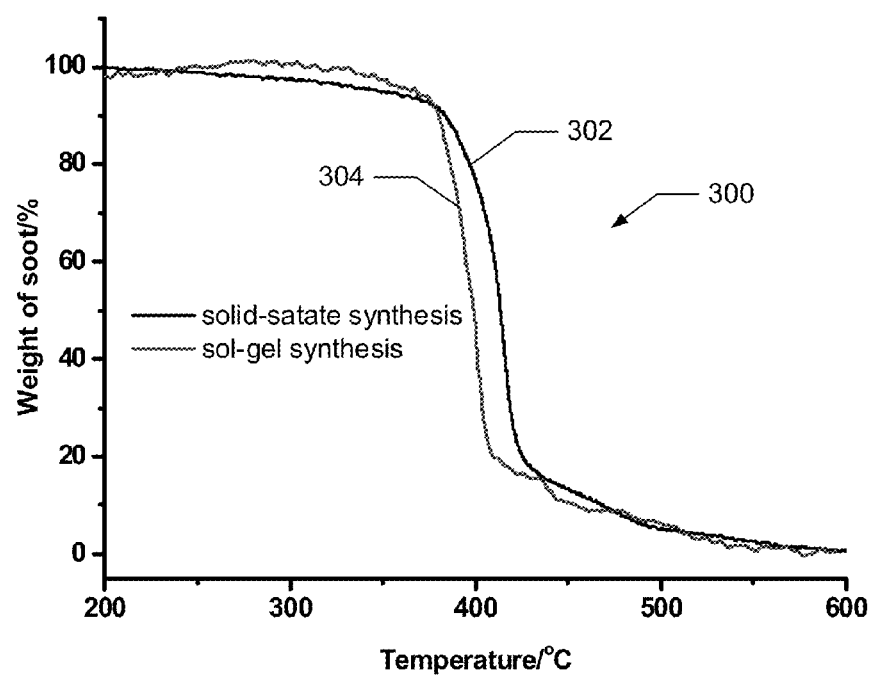
FIG. 3 illustrates a plot comparing the catalytic oxidation of carbon black by melt-quench derived KCS-1 catalyst and sol-gel derived KCS-1 catalyst, in accordance with the present disclosure.

FIG. 3 illustrates a plot 300 comparing the catalytic oxidation of carbon black (Printex-U model soot) by melt-quench derived KCS-1 catalyst 302 and sol-gel derived KCS-1 catalyst 304 respectively. For melt quenching, oxides were heated in a crucible to 1300 C, held for five hours, and quenched to room temperature. A methanol wet deposit method was utilized to produce "loose" contact between the soot particles and catalyst powders. It was found that the example sol-gel derived catalyst powders (plot 304) showed slightly lower $T_{ig}$ and $T_{50}$ than melt-quench derived powders (plot 302). For example, the $T_{50}$ of soot oxidation by the example sol-gel catalyst was 15° C. lower than that of the melt-quenched catalyst. It is known that higher surface area usually produces more intensive contact between soot and catalyst. The decrease of $T_{ig}$ and $T_{50}$ is likely due to the meso-porous structure and higher surface area of sol-gel powders compared to the melt-quench derived.

Figure 4:
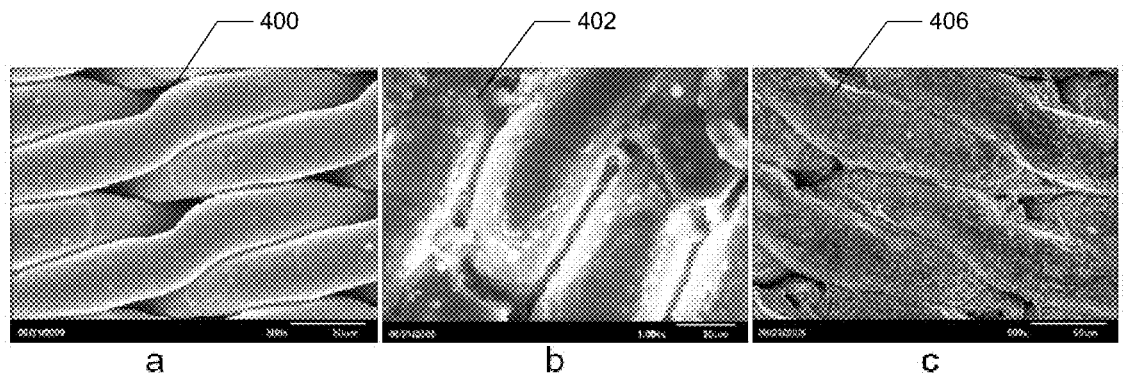
FIGS. 4a-4c each illustrates a SEM image of an as-cleaned example wire meshes, in accordance with the present disclosure.

FIGS. 4a-4c each present a scanning electron microscope (SEM) image of an as-cleaned example wire mesh 400 (FIG. 4a), the example sol-gel coated wire mesh before firing 402 (FIG. 4b), and the example sol-gel coated wire mesh after firing 406 (FIG. 4c). As shown in FIG. 4a, the example wire mesh substrate 400 has a pore size of approximately 15-20 microns and a wire thickness of approximately 40 μm, and offers good flexibility for forming different designs. In this example, the pores of the wire mesh remain open after coating application to avoid any undesired increase of back pressure for the exhaust system.

To produce the example coated structure, a 0.2% volume of surfactant, such as, for example, Triton X-100, was added into the sol-gel solution to improve the wetting ability of the sol solution on the wire mesh. Thus, in this instance, the contact angle of the sol-gel solution on the substrate plate decreased from 30° to 15° with the addition of the surfactant. The improved wetting ability of the sol solution on the wire mesh was found helpful to prevent the pores from clogging after the firing process as shown in FIG. 4c.

It can be understood that the example dip-coating process results in a more compact structure compared with the porous structure of bulk materials. In particular, the simultaneous process of evaporation, gelation, and drying of the sol-gel coating leads to a lower cross-linking degree and so a somewhat more compact structure.

In general, it has been determined that thicker gel coatings are more liable to undergo macroscopic cracking during firing. The maximum thickness achievable without cracking via non-cycled deposition is defined by a "critical thickness", and is normally less than 1 micron for ceramic thin films. When the thickness is submicron, undesired chemical reactions between the film/coating and the substrate can cause the degradation of functional coatings. In order to achieve thicker films that are not cracked, some example manufacturing processes utilize multiple film deposition and firing cycles. For example, if the thickness of the single layer is 0.1 µm, 10 deposition cycles may be used to obtain a 1 µm thick coating. Such repetitive depositions, however, may not be particularly practical in industrial applications. Hence, the present disclosure is capable of achieving thick (e.g., greater than 1 µm) single deposition crack-free coatings on wire mesh substrates, although multiple deposition cycles may be employed if desired.

Figure 5:
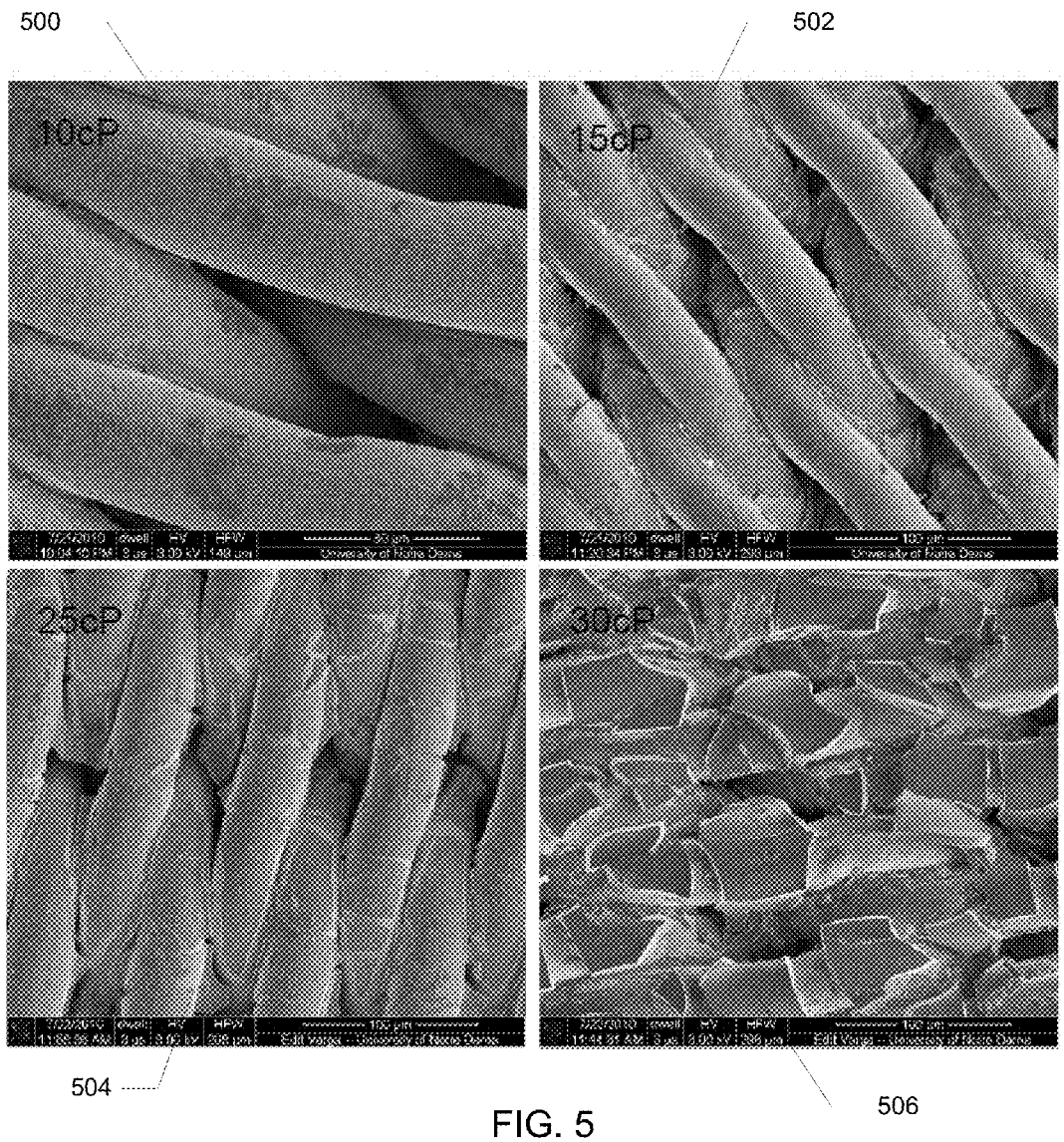
FIG. 5 illustrates the SEM images of sol-gel coatings at various sol viscosities in accordance with the present disclosure.

FIG. 5 shows the SEM images of sol-gel coatings at various sol viscosities. In the illustrated images, all the samples were heated up to 650° C. at 10° C./min and held for 20 minutes before cooling down. In the first image, a coating layer 500 was formed by a sol-gel coating at a sol viscosity of approximately 10 centipoise (cP). In the second image, a coating layer 502 was formed by a sol-gel coating at a sol viscosity of approximately 15 cP. In the third image, a coating layer 504 was formed by a sol-gel coating at a sol viscosity of approximately 25 cP, and in the last image, a coating layer 506 was formed by a sol-gel coating at a sol viscosity of approximately 90 cP. It was determined that crack-free coatings formed when the viscosities were less than approximately 25 cP. When viscosity was larger than about 25 cP, severe cracks were observed in the coating layer after firing.

Still further, ultrasonic testing in a methanol bath was used to determine the adhesive strength of the coatings, and the detachment of pieces indicated poor adhesion between the coating layer and substrate. In the present examples, there was relatively no weight loss for the crack-free coating 500 with a gel viscosity of 10 cP.

Figure 6:
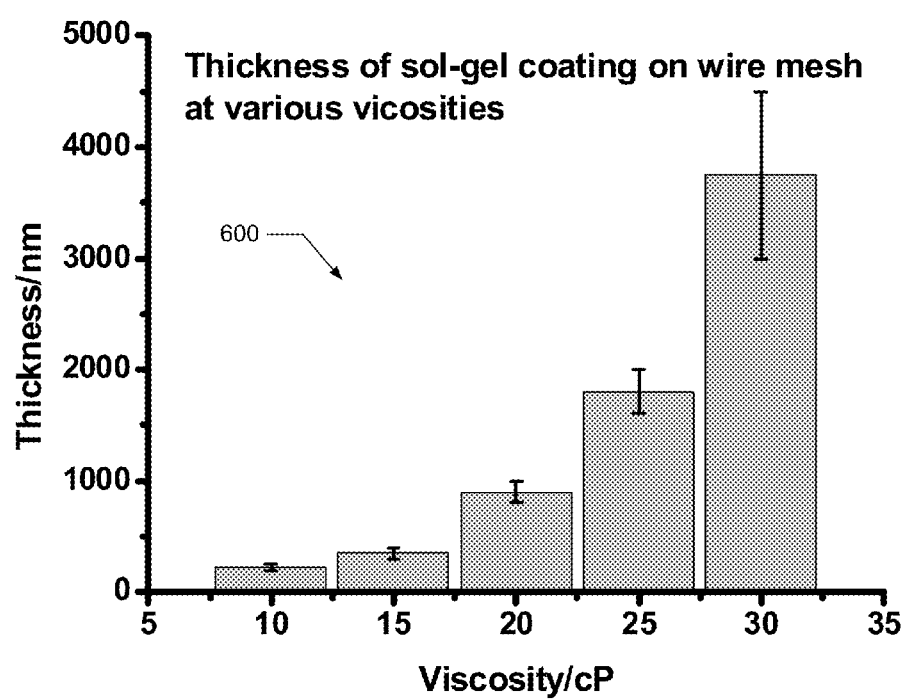
FIG. 6 illustrates a bar graph showing the measured thickness of sol-gel coatings in accordance with the present disclosure.

FIG. 6 illustrates a bar graph 600 showing that in one example, the measured thickness of the sol-gel coatings, and the thickness of the coatings increased from approximately 250 nm to about 3000-4500 nm when the viscosity increased from 10 cP to 30 cP. The viscosity dependence of the coating thickness illustrates that the catalyst loading is controllable by changing the viscosity of the sol solution. A roughly 0.25 µm thick crack-free coating was achieved by coating with 10 cP sol solution. In addition, with the aid of a surfactant the micro pores were still open, even when a very viscous sol solution (e.g. 30 cP) was applied.

Figure 7:
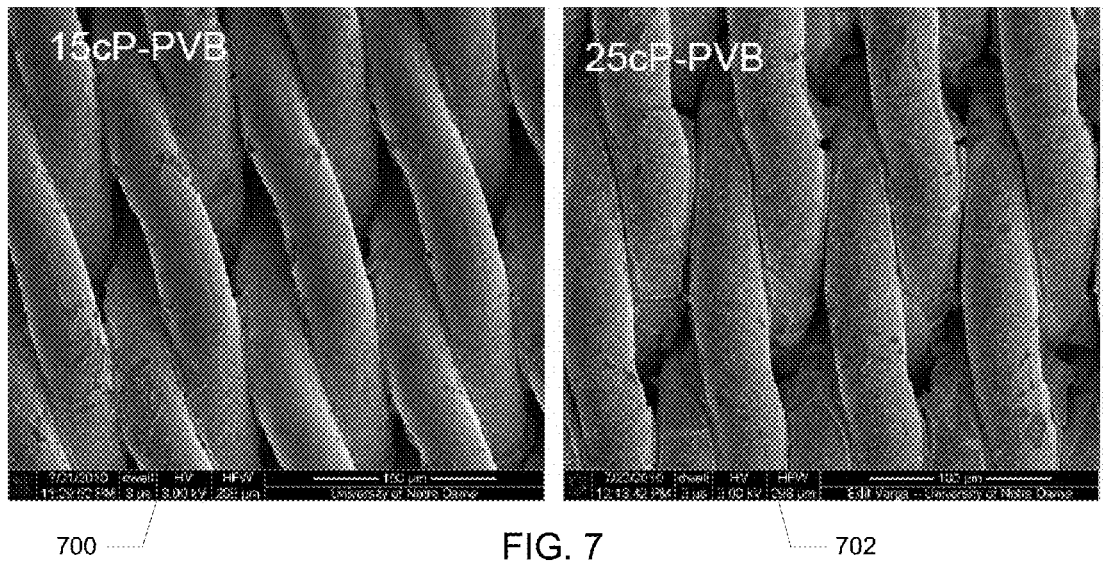
FIG. 7 illustrates the SEM images of sol-gel coatings after 0.5% of polyvinylbutyral (PVB) was added into the sol solution in accordance with the present disclosure.

In the example illustrated in FIG. 7, 0.5% of polyvinylbutyral (PVB) was added into the sol solution to prepare gel coatings on the wire mesh. In this example, all samples were heated up to 650° C. at 10° C./min. A comparison of FIG. 7 and FIG. 5 shows the morphology of coatings with and without PVB additives at the viscosities of 15 cP and 25 cP. It can be seen that that in a sample 700, the cracks disappeared when the wire mesh was coated with 15 cP sol solution resulting in a coating thickness of 0.7 µm. Although cracks still can be seen for a 25 cP sol solution coated sample 702, the gaps between coating segments are much smaller than that of coating without PVB additives. The results demonstrate that PVB additive increases the crack-free "critical thickness" of the sol gel coating. Another benefit of PVB additives is that the C=O groups could also coordinate the metal atoms of alkoxides, possibly leading to the homogeneous distribution of the elements in solution. It will be appreciated that that one can substitute other additives that act as strengtheners and plasticizers, such as for example, polyvinyl pyrrolidine (PVP). Such additives increase the strength by acting as 'long range' links holding the structure together during drying, and promote stress release by breaking up the polymeric gel network making the structure more flexible and able to deform plastically. With increased levels of additive the achievable thickness increases.

Figure 8:
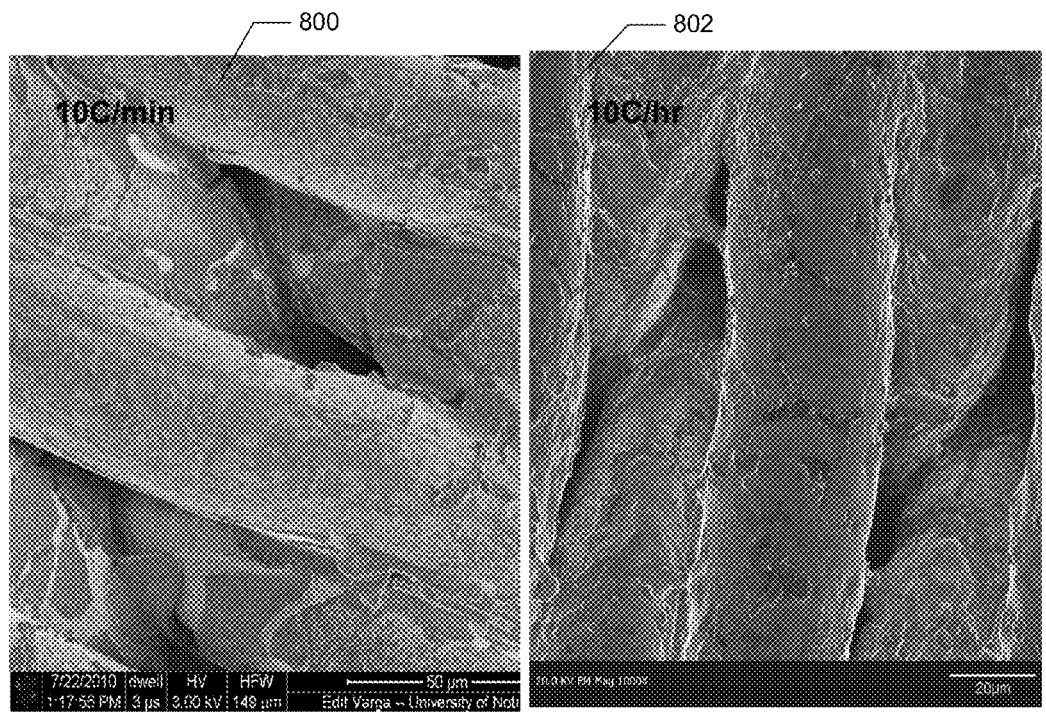
FIG. 8 illustrates the SEM images showing the morphology of sol-gel coatings after firing in accordance with the present disclosure.

A 25 cP sol solution with 0.5% PVB addition was applied on wire mesh by dip coating, and after drying the gel coatings were heated up to 650° C. at 10° C./min 800 and 10° C./hr 802 respectively. The morphology of the coatings after firing is shown in FIG. 8. It was found that higher heating rates tend to cause macroscopic cracking, whereas a crack-free coating can be achieved when the heating rate was as low as 10° C./hour 802. The results suggest that the degree of crack can be reduced by reducing the heating rate and so the drying stress at the interface of the coating and substrate.

Figure 9:
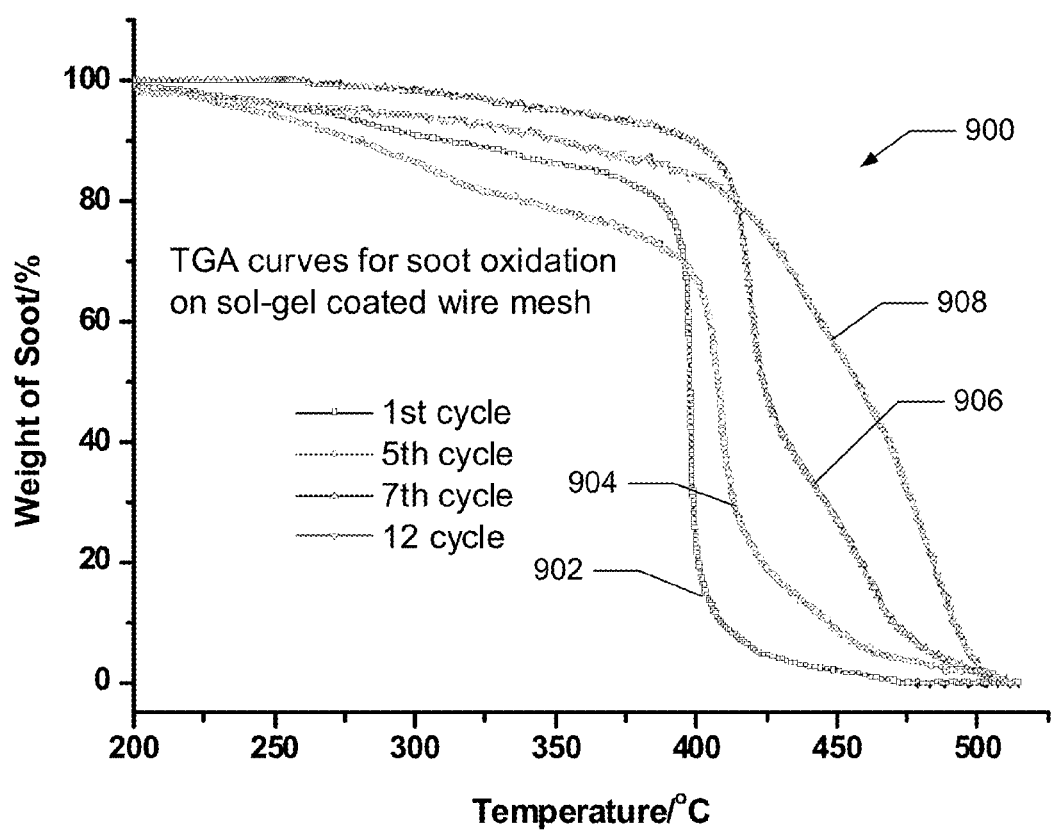
FIG. 9 illustrates a plot graph showing the soot oxidation $T_{ig}$ of an example sol-gel coating tested over multiple cycles in accordance with the present disclosure.

FIG. 9 is a plot 900 showing the soot oxidation $T_{ig}$ of an example sol-gel coating tested over multiple cycles. In particular, FIG. 9 illustrates a first cycle (902), a fifth cycle (904), a seventh cycle (906), and a twelfth cycle (908). Although the initial $T_{ig}$ is as low as approximately 370° C., the extended stability test based on repeated TGA cycles showed that the Tig increased continuously to approximately 440° C. after 12 cycles. Further study also found that the higher temperature the coatings were calcined at or the longer time the coatings were kept for at high temperature (approximately 600-800° C.), the more degraded the catalytic coatings will be. The degradation was likely due to the interdiffusion between the substrate and coating layer. In order to eliminate the effect of substrate diffusion (e.g. Fe, Ni, Cr species), a barrier layer was added before applying a catalytic layer.

Figures 10A, 10B:
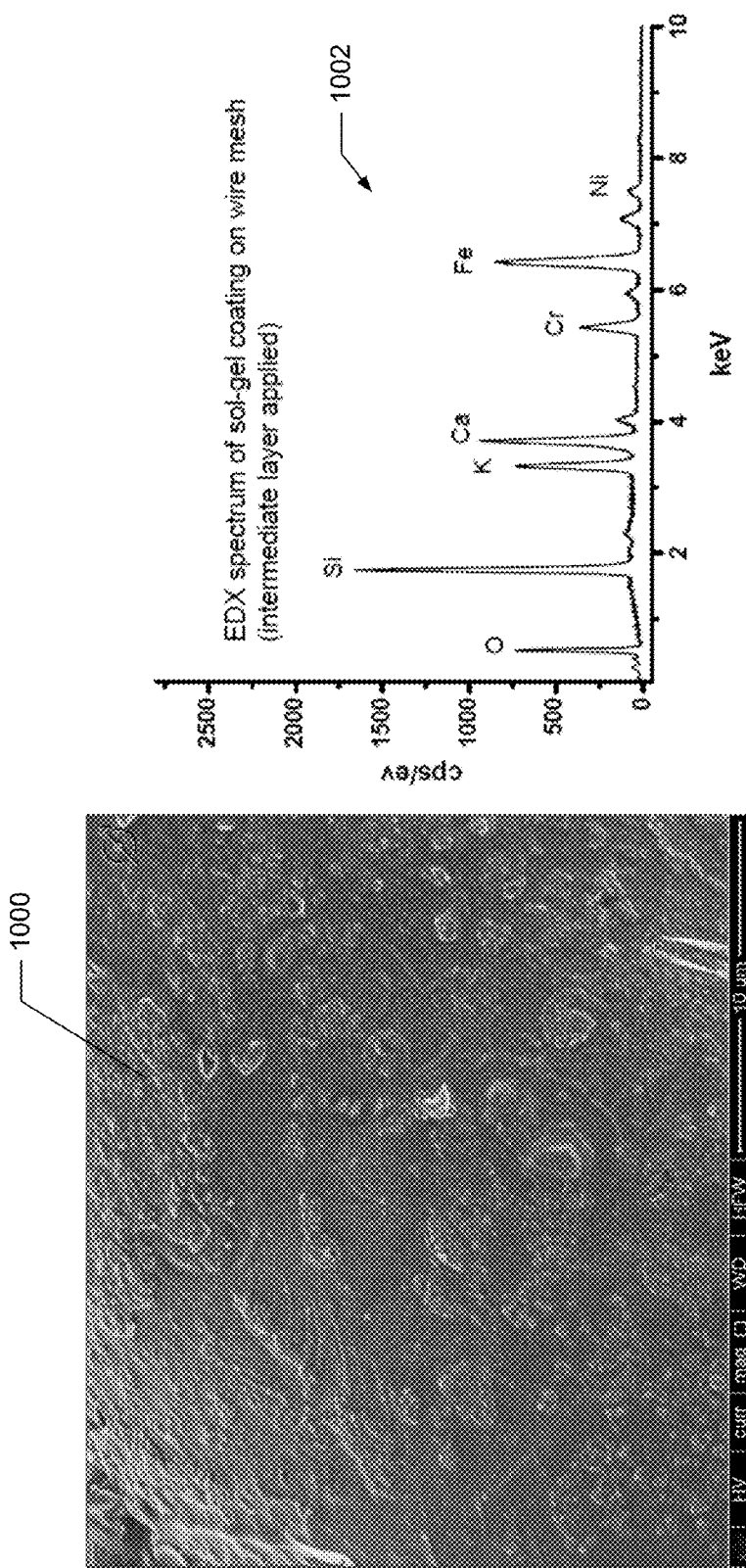

For example, to minimize metal/catalyst interactions that might occur during the firing process, an intermediate protective layer of $SiO_2$ was applied, in one example, by a similar dip-coating method. It will be appreciated that many other protective layer chemistries may be used in place of $SiO_2$ as desired. In this example, a dip-coating process based on hydrolysis and condensation of a tetraethylorthosilicate (TEOS) solution was used. FIGS. 10a, 10b show the morphology of the coating surface 1000 and the Energy-dispersive X-ray spectroscopy (EDX) 1002 spectrum obtained from the surface. The EDX spectrum 1002 shows signals from the CKS-1 silicate coating, the intermediate $SiO_2$ coating as well as the underlying substrate.

Figures 11A, 11B:
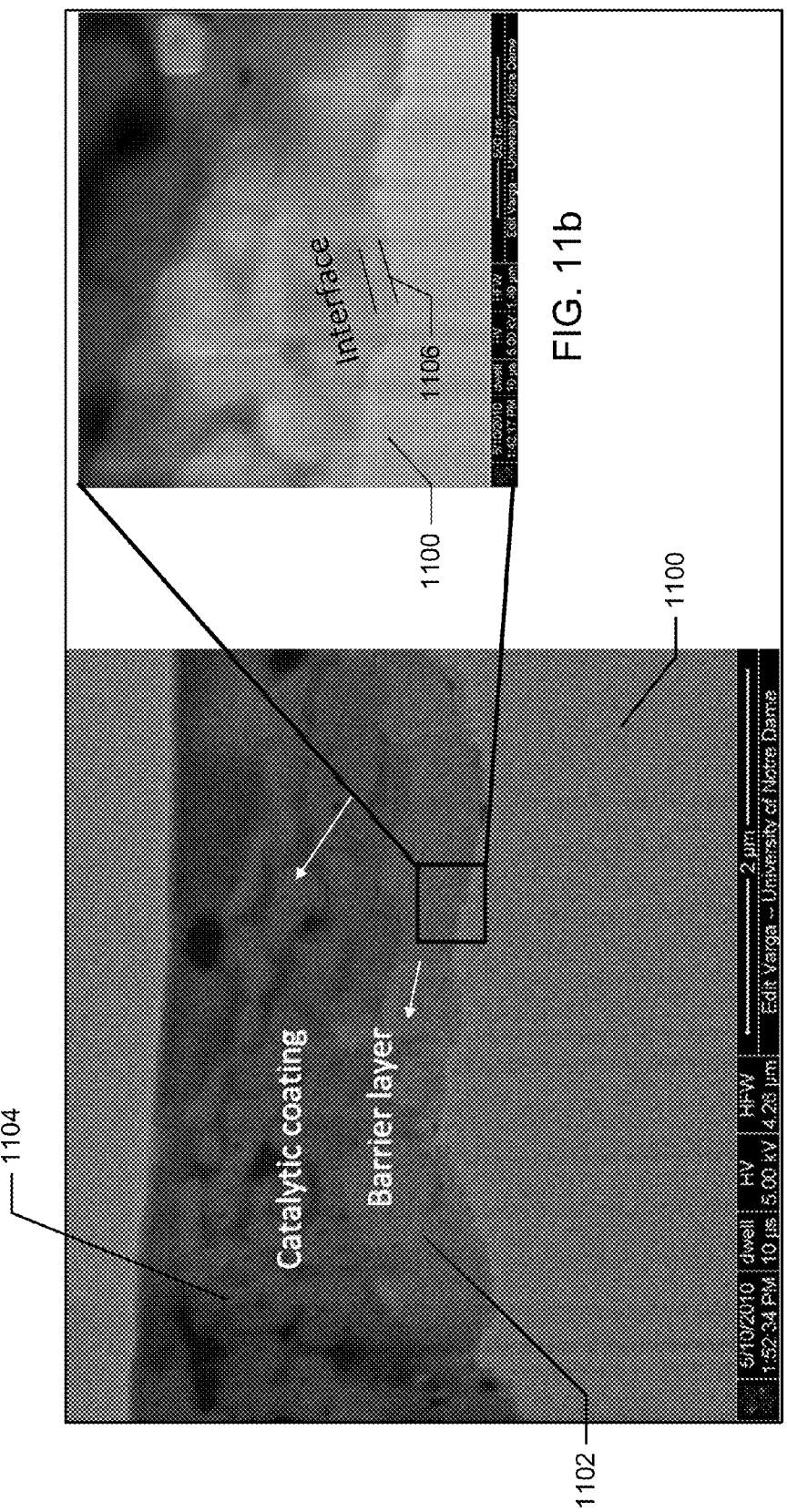
FIGS. 11a-11b illustrate the SEM backscattered images for the cross-section of a catalytic coating in accordance with the present disclosure.

FIGS. 11a and 11b illustrates the SEM backscattered images for the cross-section of the catalytic coating at different magnifications. The backscattered SEM image of the coating layer exhibits a graded structure with three primary layers; namely, a stainless steel substrate 1100 at the bottom, a barrier layer such as a $SiO_2$ barrier layer 1102 in the middle, and a catalytic KCS-1 layer 1104 at the top. The contrast differences can clearly be seen for each layer. A closer look at the interface between the $SiO_2$ barrier layer 1102 and the substrate 1100 is shown in greater detail in FIG. 11b. As observed, essentially no cracks can be seen at the interface of the two layers 1100, 1102, and the ultrasonic bath test also suggested good adhesion strength between the catalytic layer 1104 and the substrate 1100. In at least one example, the optimum adhesion was achieved through the formation of an approximately 100 nm thick interfacial layer 1106 as marked in identified in FIG. 11b.

Figure 12:
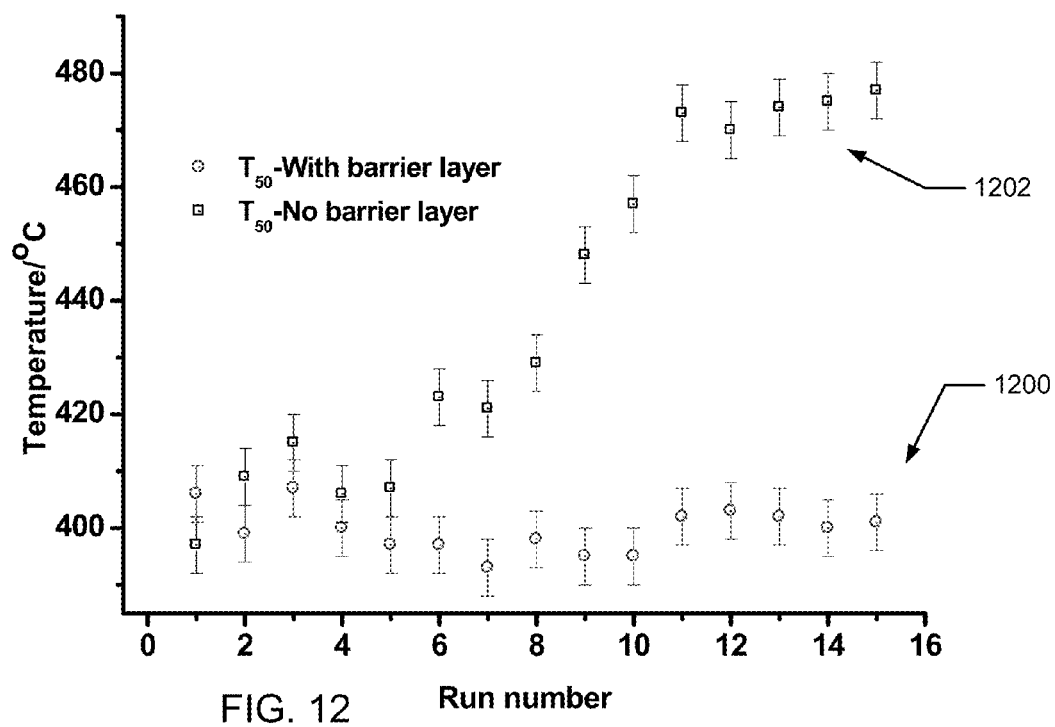
FIG. 12 illustrates a plot of the variations of $T_{50}$ during the stability test in accordance with the present disclosure.

To further demonstrate the capabilities of the example filter, a stability test was performed with repeated TGA cycles consisting of soot capture from the flame on the coated substrate, burning it off in the TGA 10% $O_2$-5% $CO_2$—$N_2$ via a temperature ramp, capturing again, etc. The variations of $T_{50}$ during the stability test with or without the barrier layer 1102 are shown in FIG. 12 as reference plots 1200, 1202, respectively. It can be seen that the stability of the catalytic coating was significantly improved with the presence of the intermediate $SiO_2$ layer (plot 90) because the barrier layer prevents Fe/Ni/Cr from diffusing into the catalytic coating layer.

In yet another example, cordierite ($Mg_2Al_4Si_5O_{18}$), which is the dominant substrate material in diesel particulate filter (DPF) fabrication, was examined by X-ray diffraction (XRD) and scanning electron microscopy (SEM) to determine the interaction of cordierite with a K-containing soot oxidation catalyst as a function of temperature. The catalytic performance of mixtures at different heat treatment temperatures have been examined with thermogravimetric analysis (TGA) via non-isothermal or/and isothermal experiments. Two comparable loose contact methods were used. The alkalisilicate coating was also applied to a cordierite filter by a sol-gel process for the purpose of passive regeneration of a DPF, and the catalytic soot oxidation was then performed on the coating material at relative low temperatures (<600° C.).

In this example, sieved KCS-1 powders (~45 μm) and cordierite ($2MgO-2Al_2O_3-5SiO_2$) were mixed in the weight ratio of 1:1 by grinding for 10 minutes with mortar and pestle. The mixed powders were then heated and held at various temperatures for 2 hours in a SiC furnace. The interaction between cordierite and KCS-1 as a function of temperature was determined by XRD and morphological changes using SEM. The change of catalytic performance was also used to judge the degree of interaction due to the active species ($K_2O$) in the glass catalyst having the most potential to interact with cordierite.

The example sol-gel process, as described above, was used to coat equivalent KCS-1 composition onto a flow-through cordierite monolith (such as, for example, on a monolith supplied by Cummins Inc.). To make a K—Ca—Si—O glass sol-gel solution, TEOS ($Si(OC_2H_5)_4$ 98%), calcium nitrate tetrahydrate ($CA(NO_3)_2 \cdot 4H_2O$, ACS reagent), and potassium nitrate ($KNO_3$, ACS reagent) were used as precursors. Dip-coating was carried out to apply the sol-gel silicate glass on cordierite filter when the viscosity of the sol-gel solution reached 15 cP. The coated samples were air dried at ambient atmosphere until they no longer exhibited weight loss due to evaporation of radical water, acid catalyst, and solvent. The dried samples were then slowly heated in a SiC furnace (10° C./min) to 650° C. and held for 20 minutes.

Two kinds of model soot were used in this study, namely Printex-U carbon black and labmade flame soot. Printex-U carbon black was used as a model soot to mix with the catalyst in a powder form, and flame soot was introduced directly to the coated material from a burner. The preparation of catalyst and soot mixtures was found to be important for both activity and reproducibility. The best results in terms of reproducibility in powder form were obtained with the following procedures: 100 mg catalyst powder/mixture and corresponding carbon black (weight ratio 10:1) were carefully mixed by grinding for 1 minute with mortar and pestle. Prior to this mixing, the milled catalyst powder and sieved carbon black were gently mixed with a spatula for 30 seconds. The ignition temperature of KCS-1 catalyzed soot oxidation is about 370~380° C., which is comparable with the soot oxidation under real contact conditions. The loose contact condition between catalyst and soot used in this study is hence thought to be comparable with the real loose contact condition. For the coated cordierite filter, the soot was applied from a TIKI burner with a PVC tube held above the flame, with the best comparable real contact condition being achieved when the length of tube is 5 cm.

Two TGA experimental methods were utilized, namely a high resolution ramp mode and isothermal conditions. The high resolution ramp (20° C./min, res=3) mode was primarily used to evaluate the catalytic activity based on the ignition temperatures ($T_{ig}$) or the temperature where half of the soot has been combusted ($T_{50}$). Reaction rates were determined by performing isothermal experiments. The samples were heated to desired temperatures under inert gas flow ($N_2$). The gas flow was switched to simulated diesel exhaust gas 10% $O_2$-5% $CO_2$—$N_2$ at time zero. A flow rate (120 ml/min) was chosen, and the experiments lasted 90 minutes to allow complete oxidation. Crystal structure of the cordierite and glass catalyst was examined by a Bruker D8 Advance X-Ray diffractometer using Cu—$K_{\alpha 1}$ radiation. A Hitachi 4500 FESEM equipped with EDS was used to study the morphology and elemental distribution of the catalysts.

Because the rate of hydrolysis of TEOS is low in neutral solutions, 2M nitric acid was used to catalyze the TEOS hydrolysis during the sol preparation. It is known that the polymerization process of a TEOS based sol solution is pH-dependent and the stability is maximized at the isoelectric point (IEP) where the pH=2.2. Increases in the ratio of water to alkoxide, temperature, and concentration of alkoxide all decrease the stability of the sol solution and so the gelation time ($t_{gel}$) increases. In this example, the water to TEOS molar ratio was fixed at 43:1 to ensure complete dissolution of $KNO_3$ and $Ca(NO_3)_2$ in the sol solution. The initial pH value of the sol-gel solution was adjusted to 2.2, and the solvent (ethanol) to TEOS molar ratio was fixed at 4:1. After making the sol solution, the sol-gel system was sealed in Pyrex glass beaker at room temperature for gelation.

Figure 13:
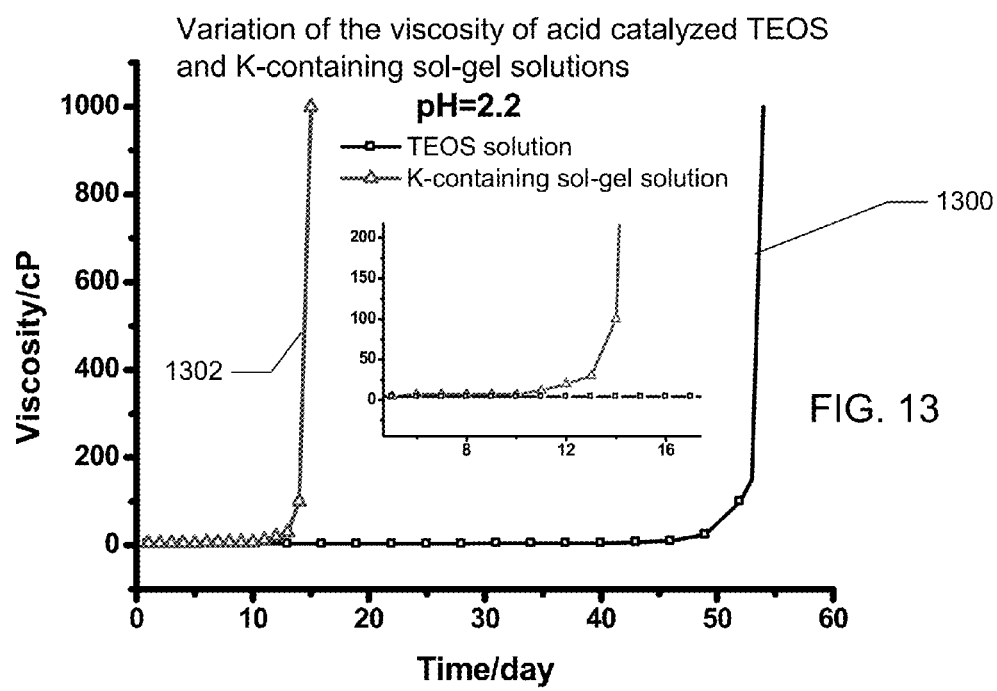
FIG. 13 illustrates a plot of the variation of viscosity of acid catalyzed TEOS 1300 and KCS-1 1302 solution after introducing $K^+$ and $Ca^{2+}$, in accordance with the present disclosure.

FIG. 13 shows the variation of viscosity of acid catalyzed TEOS 1300 and KCS-1 1302 solution after introducing $K^+$ and $Ca^{2+}$. The particle size analysis showed that after adding $K^+$ and $Ca^{2+}$ and stirring for one hour, the polymer size increased from approximately 8 nm to approximately 20 nm and the viscosity increased as the polymers grew. In the absence of salt, no chaining or aggregation occurs and the sol solution is much more stable because the particles are mutually repulsive. The addition of salt reduced the thickness of the double layer at a given pH, and thus dramatically reduced the gelation times.

It will be noted that unlike the metallic wire mesh filter discussed above, a through-wall cordierite filter has a more complicated shape and a different soot filtration mechanism. The advantage of the disclosed sol-gel process is that the coating can easily penetrate into all open pores in the monolith support. Hence, a pore-filling coating process involves having most of the coating attached inside the pores instead of only being attached to the external surface of the monolith channels.

Figure 14:
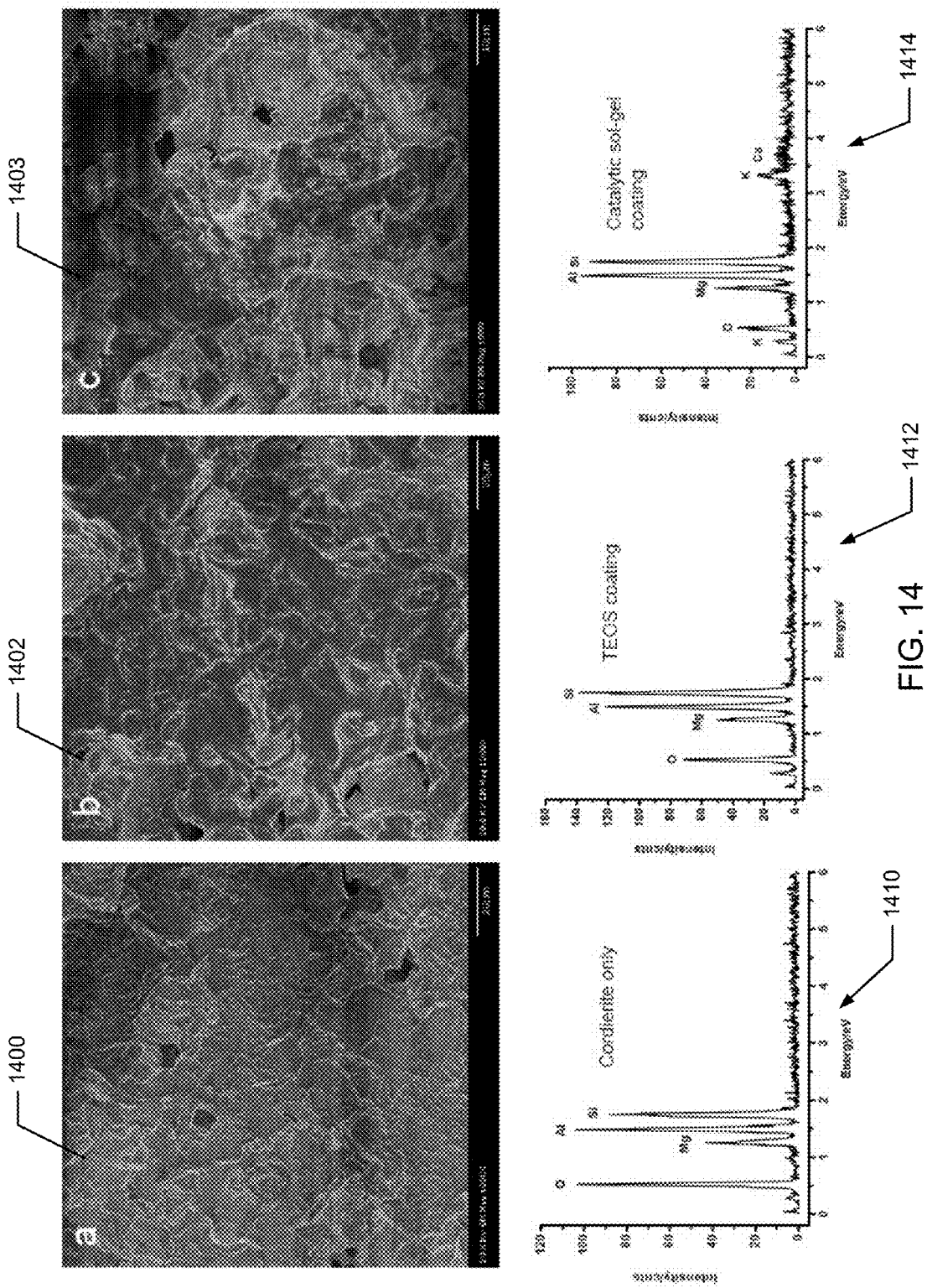
FIGS. 14a-14c illustrate plots and SEM images of the surface morphology of a cordierite filter before, during, and after carrying out application of a coating, respectively, in accordance with the present disclosure.

FIGS. 14a-14c show the surface morphology of a cordierite filter before 1400, during 1402, and after 1404 carrying out application of a coating in accordance with the present disclosure. In this example, the cordierite flow-through filter was cleaned and cut to 0.5"×1" and 0.1" thick coupons, and the acid-catalyzed TEOS solution (15 cP) and catalytic K—Ca silicate sol gel solution (15 cP) were applied to the filter coupons by dip-coating respectively. The corresponding EDS spectra 1410, 1412, 1414, respectively are shown underneath each SEM image in FIGS. 14a-14c, and the elemental analysis results (in wt %) are listed in Table 1 below. The surface of the cordierite filter shows features typical of a sintered silicate material, and was relatively flat after extrusion and firing. In comparison with pure cordierite 1400, the surface of the wall of the cordierite filter after TEOS coating 1402 was rougher and more Si rich according to the EDS spectrum, which can be seen in FIG. 14b. This implies the success of applying a sol-gel coating on the cordierite filter. The change of surface morphology shown in FIG. 14c and the presence of K and Ca in the corresponding EDS data show that the K containing catalytic coating was successfully applied as well.

TABLE 1

|  | Al | Si | Mg | O | K | Ca |
|---|---|---|---|---|---|---|
| Cordierite only (FIG. 14a) | 19.1 | 20.9 | 8.8 | 49.6 | — | — |
| TEOS Coating (FIG. 14b) | 23.7 | 32.2 | 6.7 | 36.2 | — | — |
| Catalytic sol-gel coating (FIG. 14c) | 28.0 | 37.2 | 5.1 | 20.6 | 4.8 | 1.0 |

Figure 15:
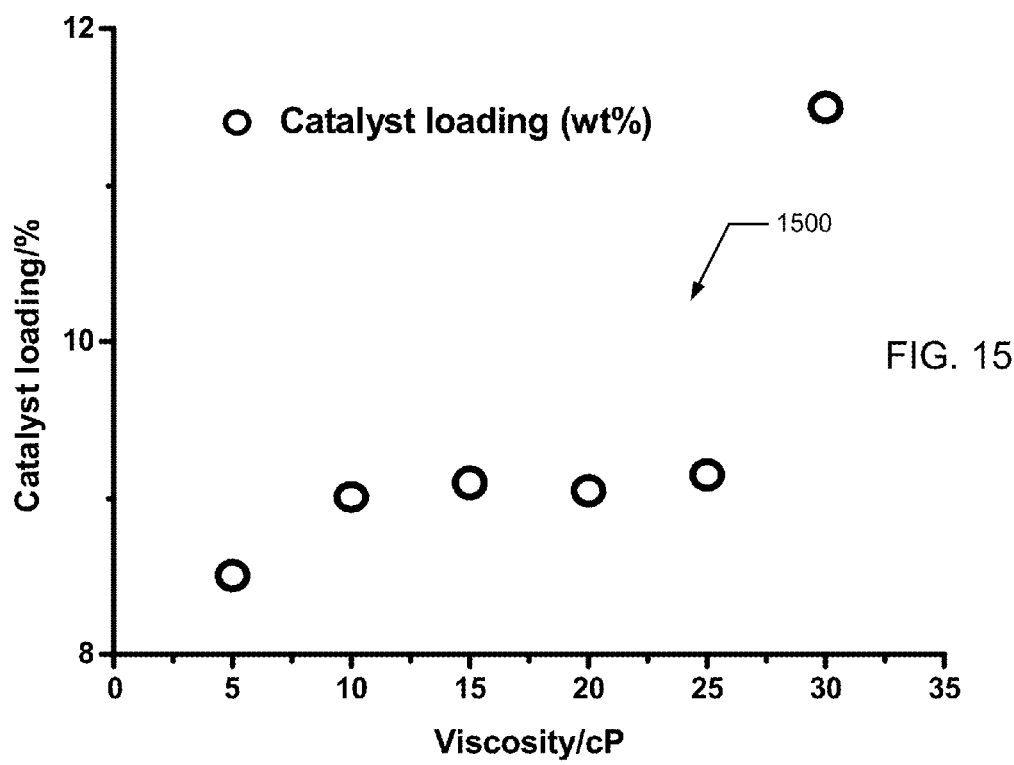
FIG. 15 illustrates a plot of catalyst coating for each cycle at various viscosities of the sol solution.

FIG. 15 shows a plot 1500 of catalyst coating for each cycle at various viscosities of the sol solution. It was found that the catalyst loading for each cycle remained at about 9 wt % when the viscosities range from approximately 10 to 25 cP, and that the loading is slightly lower than 9 when the viscosity is 5 cP. When a very viscous sol solution, such as for example, 30 cP was used, it was found that a large amount of catalyst was coated on the wall surface of the cordierite monolith and some of the micropores were blocked, leading to more catalyst loading. However, this is not desirable because clogging of the micropores on the wall surface does not allow multiple cycle application of the sol solution into the micropores of the monolith.

Figure 16:
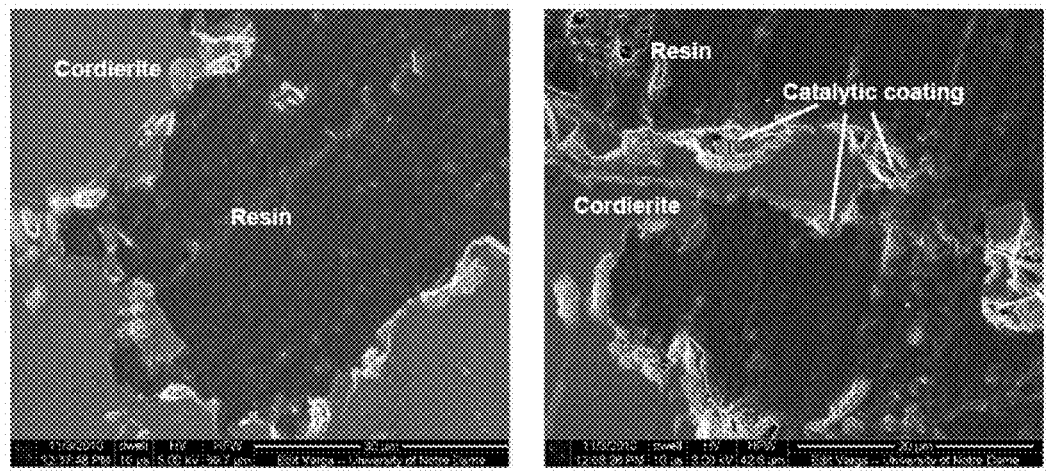
FIG. 16 illustrates SEM cross section images of the cordierite filter before and after coating in accordance with the present disclosure.

SEM cross section images of the cordierite filter before 1600 and after 1602 coating are shown in FIG. 16. The ultimate catalytic layer is around ~1 micron thick for each cycle and the micro pores are still wide open after coating.

Figure 17:
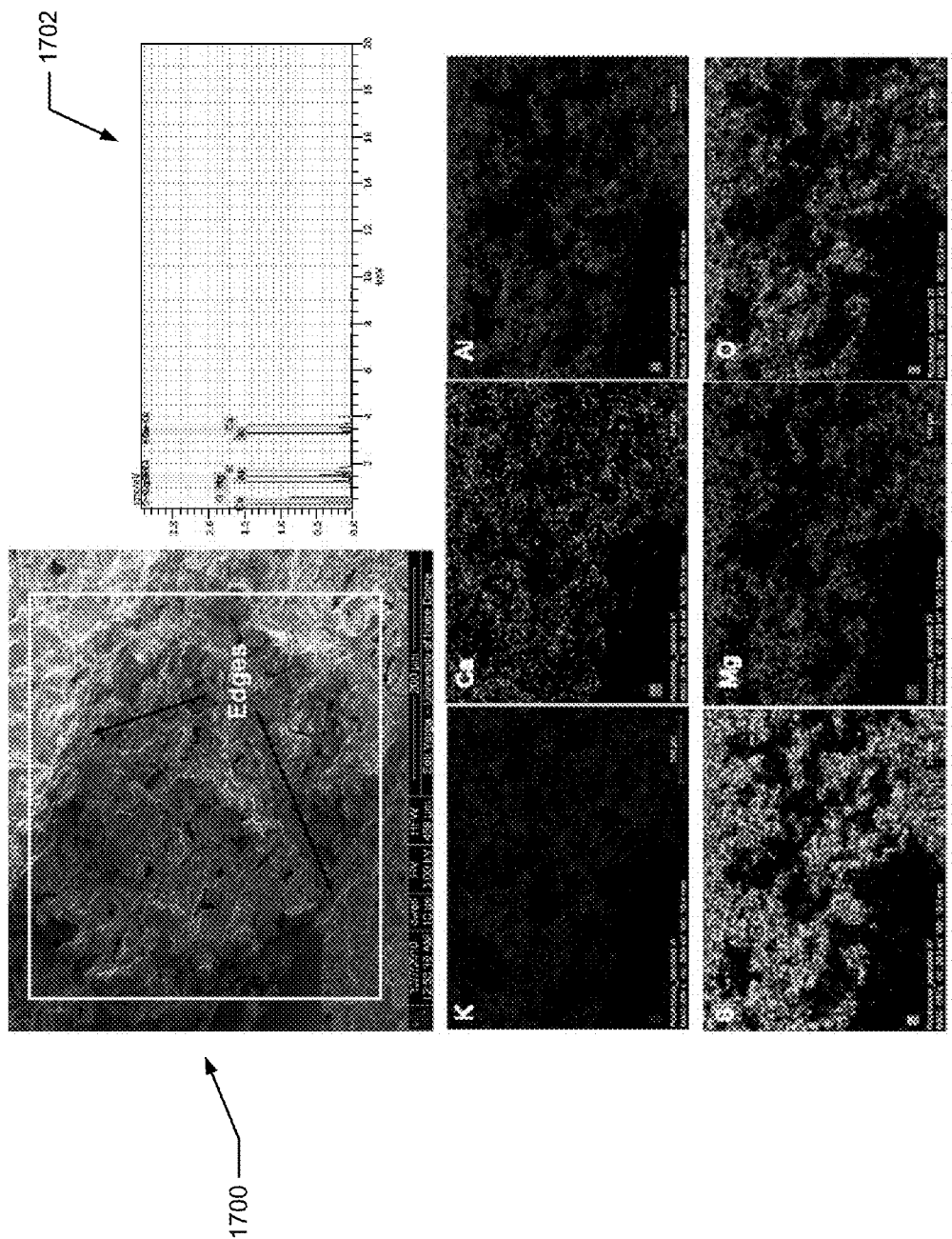
FIG. 17 illustrates a SEM image and elemental mapping on a fracture section of the coated cordierite sample.

An SEM image 1700 and elemental mapping 1702 on a fracture section of the coated cordierite sample are shown in FIG. 17. It can be seen that the K and Ca are distributed uniformly across the wall of the cordierite. This indicates that the sol-gel solution (15 cP) penetrated into the filter during dip-coating and filled up all the micropores. The micropores opened up after drying and heat treatment due to the shrinkage of the gel material. No cracks were found, probably due to the good wetting between the gel coating and the cordierite. The adhesion quality of the coating layer was determined by measuring the weight change of the specimen after sonication in ethanol, with no noticeable weight change being considered as an indication of good adhesion between the coating layer and the cordierite substrate.

Figure 18:
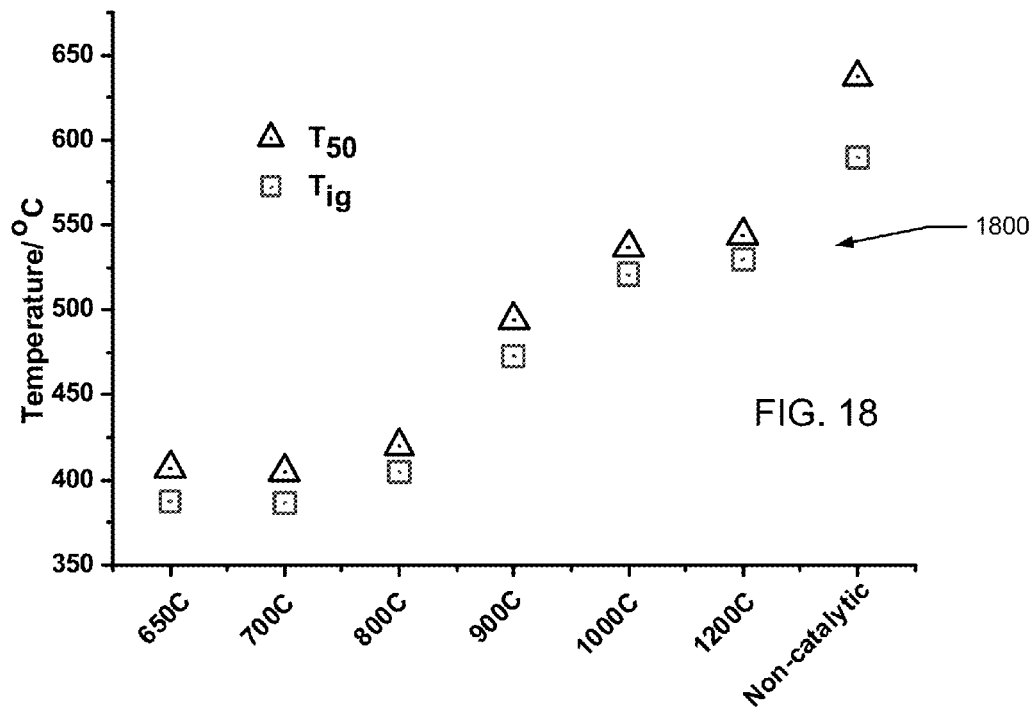
FIG. 18 illustrates a plot showing the catalytic performance of the mixtures of cordierite and KCS-1 calcined at various temperatures.

High resolution ramp (20° C./mm, res=3) mode was used to evaluate the catalytic activity based on the ignition temperature ($T_{ig}$) and the temperature where half of the soot has been combusted $T_{50}$. The catalytic performance of the mixtures of cordierite and KCS-1 calcined at various temperatures are shown in FIG. 18 at plot 1800. Compared with the samples heat treated at lower than 700° C., the $T_{ig}$ for the sample calcined at 800° C. increased slightly by approximately 10-15° C. It is likely that the increase of $T_{ig}$ is due to the coarsening/softening of glass catalyst during heat treatment, leading to a significant decrease in surface area. When the heat treatment temperature was higher than approximately 900° C., the $T_{ig}$ and $T_{50}$ increased by around 70 to 120° C. indicating significant degradation of catalytic performance in soot oxidation. This indicates that strong interactions between cordierite and the KCS-1 silicate catalyst occurred at temperatures around 900° C.

Figure 19:
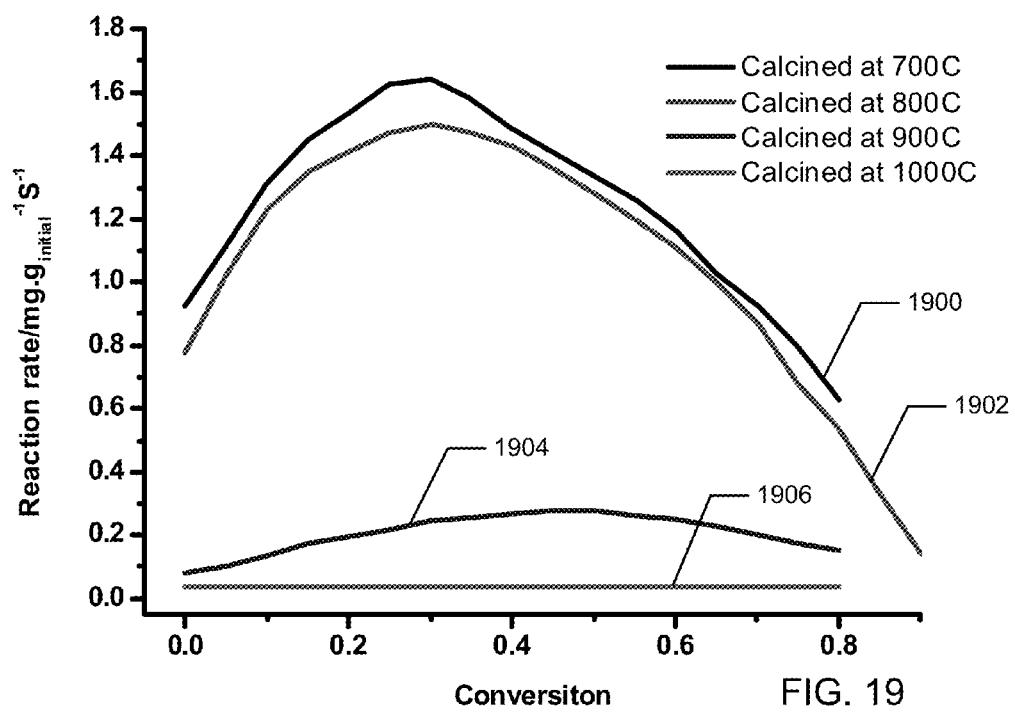
FIG. 19 illustrates a plot of calcined at various temperatures.

From the soot oxidation curves of cordierite/KCS-1 glass catalyst mixtures calcined at lower temperatures, oxidation of soot can be seen at the temperature as low as 350° C., and a temperature of 380° C. was chosen for the activity study of these catalysts because an appropriate oxidation rate can be observed at a temperature close to $T_{ig}$. The calculated reaction rates of catalytic soot oxidation as a function of conversion under isothermal heating at 380° C. are illustrated in FIG. 19. FIG. 19 illustrates a plot clalcined at approximately 700° C. (1900), 800° C. (1902), 900° C. (1904), and 1000° C. (1906), respectively. It was found that the catalytic combustion curves show a rise initially and reach a maximum in the reaction rate. When heating at 700° C. and 800° C., the maximum reaction rates are 1.5 mg·g$^{-1}$·s$^{-1}$ and 1.65 mg·g$^{-1}$·s$^{-1}$, respectively. However, when heating at 900° C., the maximum reaction rate decreased by approximately 80% to 0.3 mg·g$^{-1}$·s$^{-1}$ and it barely showed any activity at 380° C. when heated at 1000° C. Hence the upper use temperature for this material with cordierite is, in this example, between approximately 800-900° C.

Figure 20:
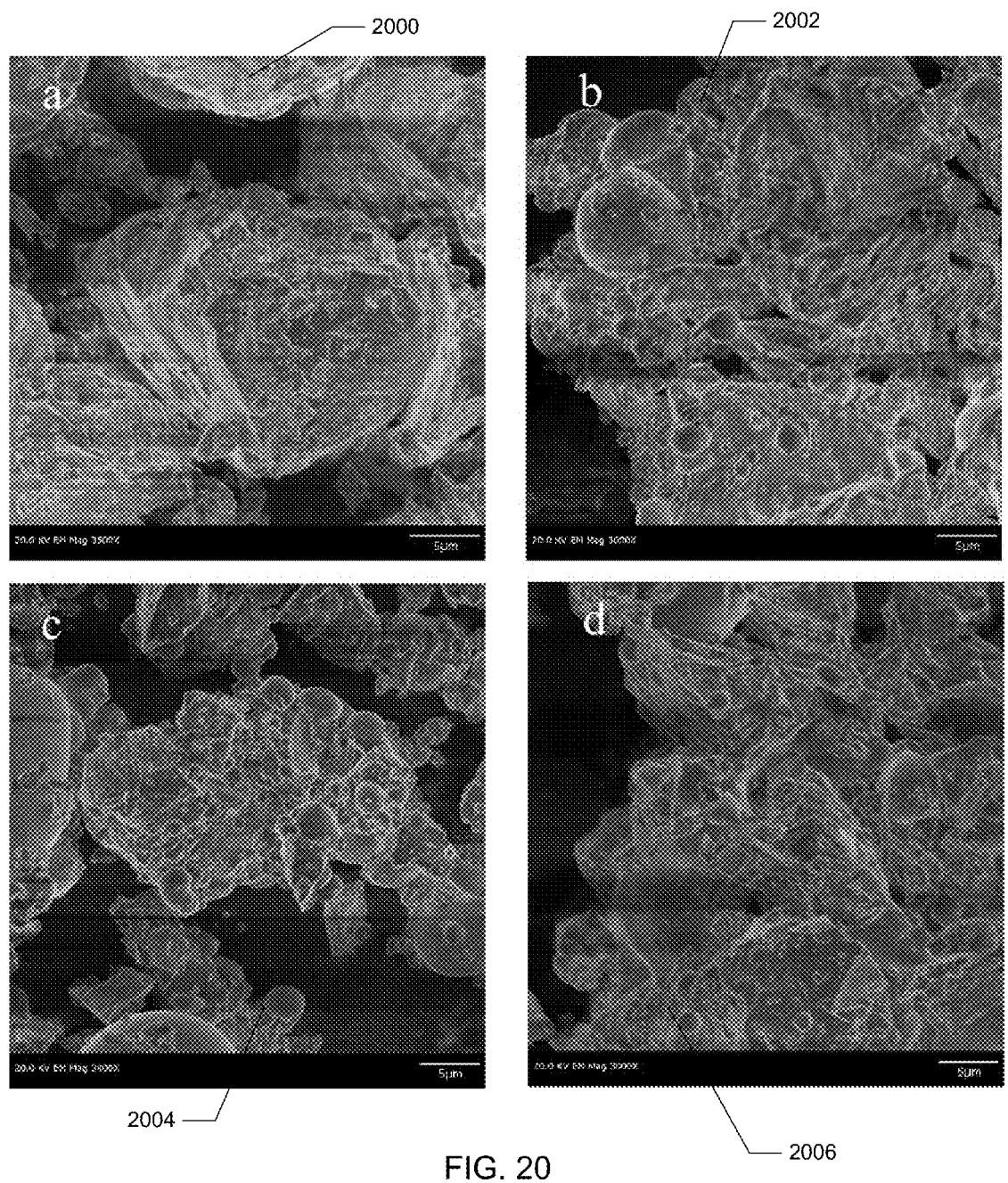
FIGS. 20a-20d illustrate SEM images showing the morphology of cordierite, and the glass and cordierite mixtures calcined at various temperatures.

FIGS. 20a-20d show the morphology of cordierite 2000, and the glass and cordierite mixtures calcined at 620° C. (2002), 650° C. (2004), and 700° C. (2006) respectively. Due to the relative low softening temperature of KCS-1 glass (610° C.), firing at 620° C. for 2 hours made the glass powders have a more spherical, nonaggregated shape. As shown in FIG. 20b, some of the glass spherical powders aggregated with cordierite powders, while some of them are still separate from the cordierite powders. As can be seen in FIG. 20c, when the firing temperature increases to 650° C. the cordierite particles were bridged with glass spheres (necking), and coarsening of the glass powder also occurred due to the aggregation of glass particles. FIG. 20d indicates that when firing temperature was at approximately 700° C., severe aggregation between glass and glass/cordierite occurred due to the melting of glass. On the other hand, the shape of the glass particles contacting cordierite powders was nonspherical and wetted the cordierite. At all these heat treatment temperatures, the morphology of cordierite particles did not seem change due to its much better thermal stability. However, the overall particle size of the mixture increases with the increase of temperature, which might lead to notable decrease in the surface area.

Figure 21:
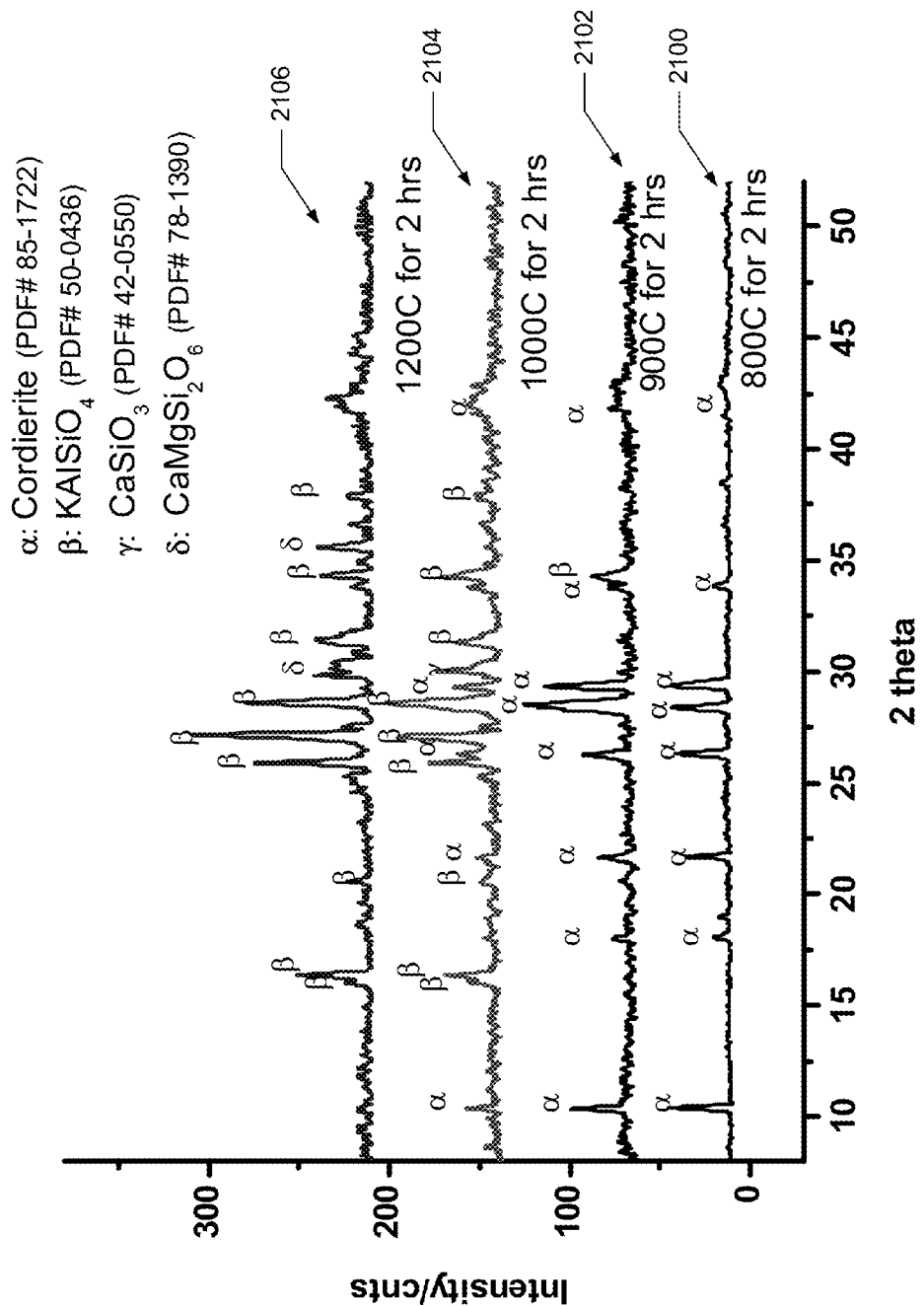
FIG. 21 illustrates a plot of the XRD patterns for the calcined mixture of cordierite and glass catalyst at various temperatures.

Both pure magnesium cordierite ($Mg_2Al_4Si_5O_{18}$) and the mixture of cordierite and KCS-1 powders (50/50 in wt %) were annealed isothermally in a SiC furnace at approximately 650° C., 700° C., 800° C., 900° C., 1000° C., 1200° C. for 2 hours respectively. The powder diffraction patterns were obtained using Bruker D8 advanced diffractometer (θ/2θ, Cu—K$_\alpha$ radiation). The XRD results showed that the commercial magnesium cordierite is in an ordered orthorhombic form and is still stable after heat treatment at 1200° C. for 2 hours. The XRD patterns for the calcined mixture of cordierite and glass catalyst is shown in FIG. 21 wherein a plot for 800° C. (2100), 900° C. (2102), 1000° C. (2104), and 1200° C. (2106) is shown. There is no new phase formed when the temperature is lower than 800° C. At higher temperatures cordierite tends to interact with the K-containing catalyst and form new phases due to the presence of the active species, $K_2O$ and CaO. The mixture calcined at 900° C. still showed primarily peaks of cordierite, and only one new peak appeared which corresponds to KAlSiO$_4$ For the mixture calcined at 1200° C., the peaks of cordierite completely disappeared, and the main phases are KAlSiO$_4$ and CaMgSi$_2$O$_6$. The results indicate that no interaction took place until 900° C., and heating at higher than 1000° C. caused considerable interaction between the glass and cordierite. However, the presence of CaMgSi$_2$O$_6$ in the sample heated at 1200° C. indicated that CaO tended to interact with cordierite at higher temperatures (e.g. 1200° C.) than K$_2$O.

The results suggest the following possible reactions between cordierite and K-containing silicate catalyst at 1000° C. Molten KCS-1 catalyst (35K$_2$O-13CaO-52SiO$_2$) first wets the surface of the cordierite sample, penetrating into inner regions of the sample along grain boundaries and through open pores. Then a reaction between cordierite and K2O occurs to form KAlSiO$_4$.

Mg$_2$Al$_4$Si$_5$O$_{18}$+K$_2$O→KAlSiO$_4$ (equation 1)

When heating at approximately 1200° C., a reaction between cordierite and CaO occurs to form CaMgSi2O$_6$:

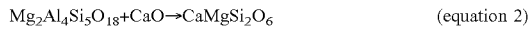

Mg$_2$Al$_4$Si$_5$O$_{18}$+CaO→CaMgSi$_2$O$_6$ (equation 2)

Figure 22B:
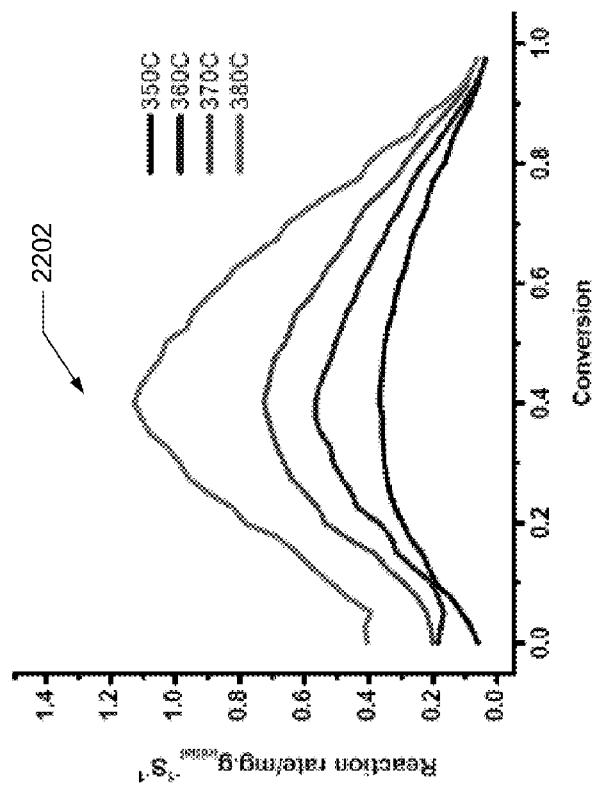
FIGS. 22a-22b illustrate plots of the TGA curves and the calculated reaction rates for catalytic soot oxidation.
Figure 22A:
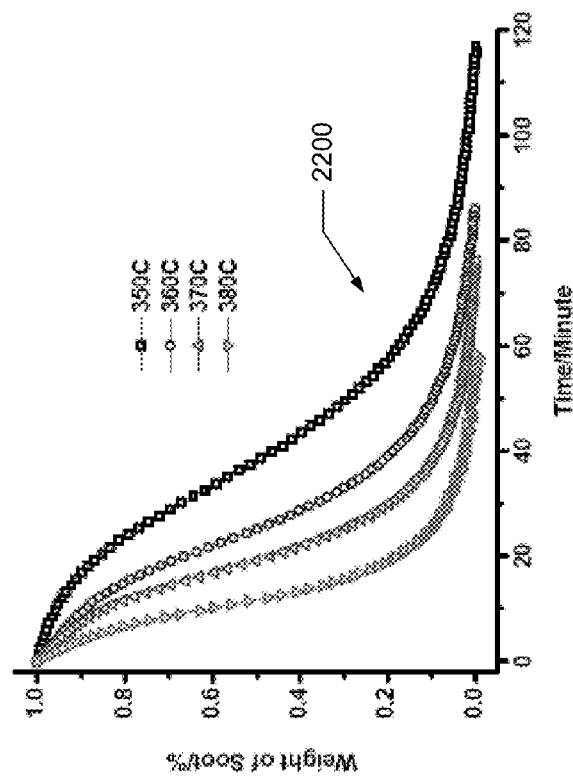

Isothermal oxidation of the coated cordierite samples was carried out at 350° C., 360° C., 370° C., and 380° C. respectively, after applying soot by a flame deposit method. The TGA curves and the calculated reaction rates for catalytic soot oxidation are presented in FIGS. 22a-22b (plot 2200 and 2202). At all temperatures there is a clear enhancement of carbon combustion in the presence of the KCS-1 coating relative to noncatalytic soot oxidation. At temperatures as low as 350° C., all the soot was burned off if given enough time. At all temperatures, the soot oxidation reactivity reached a maximum at X=0.4, and the maximum reactivity increased from 0.3 to 1.2 mg·g$_{initial}^{-1}$·s$^{-1}$ when temperature increased from 350 to 380° C.

In still other example, the disclosed manufacturing method may be used to coat diesel particulate filters constructed from SiC and mullite. Additionally, the present disclosure may be utilized for coating full size filters, via any suitable sol-gel process, including, for example, sol-gel glass coating via vacuum impregnation. Similarly, while the example substrate is a metal wire mesh, it will be appreciated that the substrate may be any suitable substrate including, for example, a glass carbon and/or other fibers, before and/or after weaving.

Figure 23:
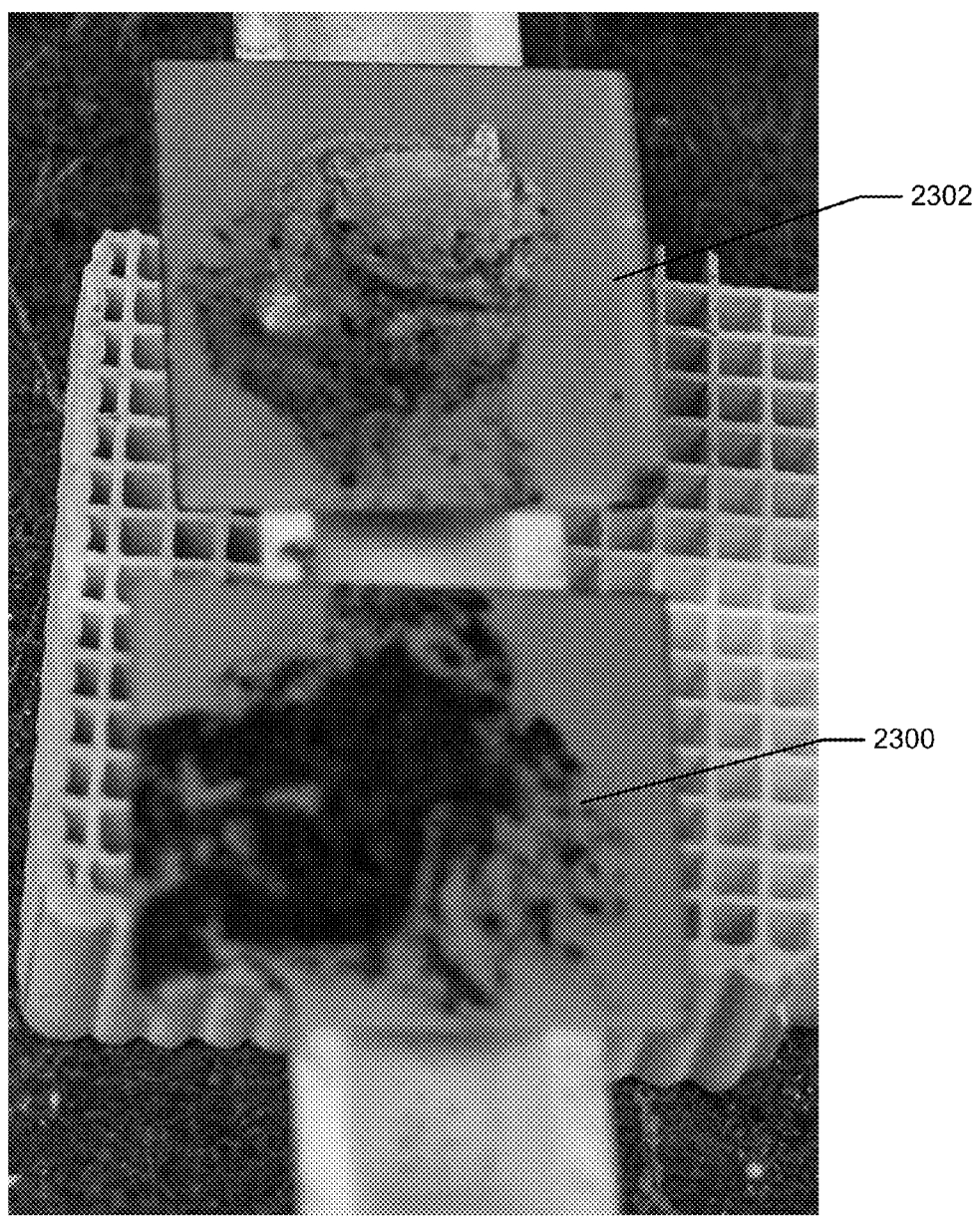
FIG. 23 illustrates food samples used to simulate a spill in an oven.

In yet other examples, the sol-gel glass described above can also be used as a coating for other suitable applications, including for example, for coating a substrate for use in a self-cleaning oven. In this example, a porcelain-enameled steel substrate may be coating by dipping with the sol-gel glass process as described above. FIG. 23 shows a food sample used to simulate a spill in an oven, with a sample without the glass coating 2300 and a sample with the glass coating 2302 after heating at 400 C for 4 hours. The sample 2300 was coated with the glass, whereas the sample 2302 was just the porcelain coating. As can be observed, the glass turned the food spill to gray ash, which can easily be wiped off, while the uncatalyzed sample 2302 formed a hard carbon char.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A method of manufacturing a catalyst for soot combustion comprising:
   synthesizing an amorphous silica-based catalyst composition by:
      preparing a catalyst coating composition comprising an alkali metal ion;
      creating a polymeric sol-gel utilizing the catalyst coating composition;
      preparing a substrate for receipt of the polymeric sol-gel; and
      applying the polymeric sol-gel to the substrate, and heating to form the amorphous silica-based catalyst composition on the substrate,
      wherein the amorphous silica-based catalyst composition comprises potassium oxide (K$_2$O), calcium oxide (CaO), and silicon dioxide (SiO$_2$).

2. A method as recited in claim 1, wherein the application of the polymeric sol-gel to the substrate comprises at least one of a sol-gel dipping process, spraying, or painting.

3. A method as recited in claim 1, wherein the substrate comprises a wire mesh.

4. A method as recited in claim 1, wherein the alkali metal ion is lithium, sodium, potassium, rubidium, or cesium.

* * * * *